(12) United States Patent
Nielsen et al.

(10) Patent No.: US 10,881,970 B2
(45) Date of Patent: *Jan. 5, 2021

(54) GAME SYSTEM

(71) Applicant: LEGO A/S, Billund (DK)

(72) Inventors: Jesper Carol Nielsen, Bryrup (DK); Bjarke Pedersen, Vejle (DK)

(73) Assignee: LEGO A/S

(*) Notice: Subject to any disclaimer, the term of this patent is extended or adjusted under 35 U.S.C. 154(b) by 0 days.

This patent is subject to a terminal disclaimer.

(21) Appl. No.: 16/789,177

(22) Filed: Feb. 12, 2020

(65) Prior Publication Data

US 2020/0179815 A1    Jun. 11, 2020

Related U.S. Application Data

(63) Continuation of application No. 15/563,832, filed as application No. PCT/EP2016/057592 on Apr. 7, 2016.

(30) Foreign Application Priority Data

Apr. 8, 2015 (DK) .................................. 2015 70204

(51) Int. Cl.
*A63F 9/24* (2006.01)
*A63F 11/00* (2006.01)
(Continued)

(52) U.S. Cl.
CPC .............. *A63F 13/98* (2014.09); *A63F 13/42* (2014.09); *A63F 13/65* (2014.09)

(58) Field of Classification Search
USPC ............. 463/1, 5, 20, 22, 25, 30, 36, 39, 46
See application file for complete search history.

(56) References Cited

U.S. PATENT DOCUMENTS 3,005,282 A    10/1961    Christiansen
2007/0211047 A1    9/2007    Doan et al.
(Continued)

FOREIGN PATENT DOCUMENTS

GB    2365796 A    2/2002
JP    2004-344483 A    12/2004
WO    2013/183328 A1    12/2013

OTHER PUBLICATIONS

Search Report & Search Opinion issued in Danish priority application No. PA 2015 70204, dated Nov. 6, 2015.
(Continued)

*Primary Examiner* — Adetokunbo O Torimiro
(74) *Attorney, Agent, or Firm* — Valeriya Svystun; Day Pitney LLP

(57) ABSTRACT

A game system, comprising: a data processing system configured to execute program instructions allowing a user to engage in digital game play; a physical toy; and a detection device configured to detect a presence of the toy within a detection area of the detection device; wherein the toy comprises two or more identification elements each detectable by the detection device when the identification element is positioned within the detection area, wherein the toy is configured to allow a user to selectively position the toy with a user-selected subset of one or more of said identification elements within the detection area; and wherein the data processing system is configured to control said digital game play responsive to the detected subset of identification elements.

19 Claims, 7 Drawing Sheets

(51) Int. Cl.
    *G06F 13/00*     (2006.01)
    *G06F 17/00*     (2019.01)
    *A63F 13/98*     (2014.01)
    *A63F 13/65*     (2014.01)
    *A63F 13/42*     (2014.01)

(56) References Cited

U.S. PATENT DOCUMENTS

| | | |
|---|---|---|
| 2009/0197658 A1 | 8/2009 | Polchin |
| 2012/0052931 A1 | 3/2012 | Jaqua et al. |
| 2012/0295704 A1 | 11/2012 | Reiche et al. |
| 2014/0179446 A1 | 6/2014 | Zuniga et al. |
| 2014/0197991 A1 | 7/2014 | Mkrtshyan et al. |
| 2014/0273729 A1 | 9/2014 | Colbert |
| 2014/0274412 A1 | 9/2014 | Sabo et al. |

OTHER PUBLICATIONS

International Search Report issued in corresponding international application No. PCT/EP2016/057592, dated Jun. 24, 2016.
Written Opinion issued in corresponding international application No. PCT/EP2016/057592, dated Jun. 24, 2016.
International Preliminary Report on Patentability issued in corresponding international application No. PCT/EP2016/057592, with amended claims, dated Jul. 24, 2017.
Non-Final Office Action issued in U.S. Appl. No. 15/563,832, dated Dec. 21, 2018.
Notice of Reasons for Refusal issued in related Japanese patent application No. 2017-552913, dated Jan. 29, 2020. (Original).
Notice of Reasons for Refusal issued in related Japanese patent application No. 2017-552913, dated Jan. 29, 2020. (English language Translation).

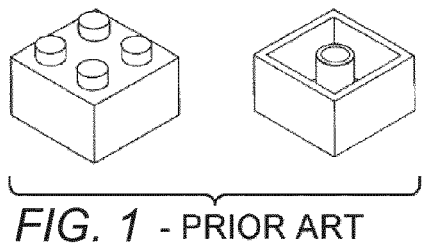
*FIG. 1* - PRIOR ART
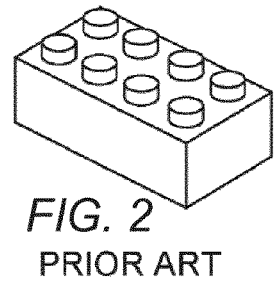
*FIG. 2*
PRIOR ART
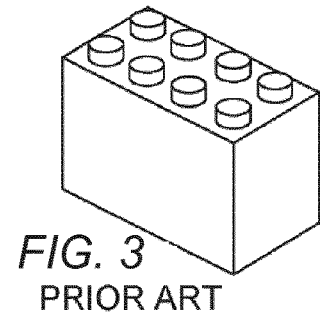
*FIG. 3*
PRIOR ART
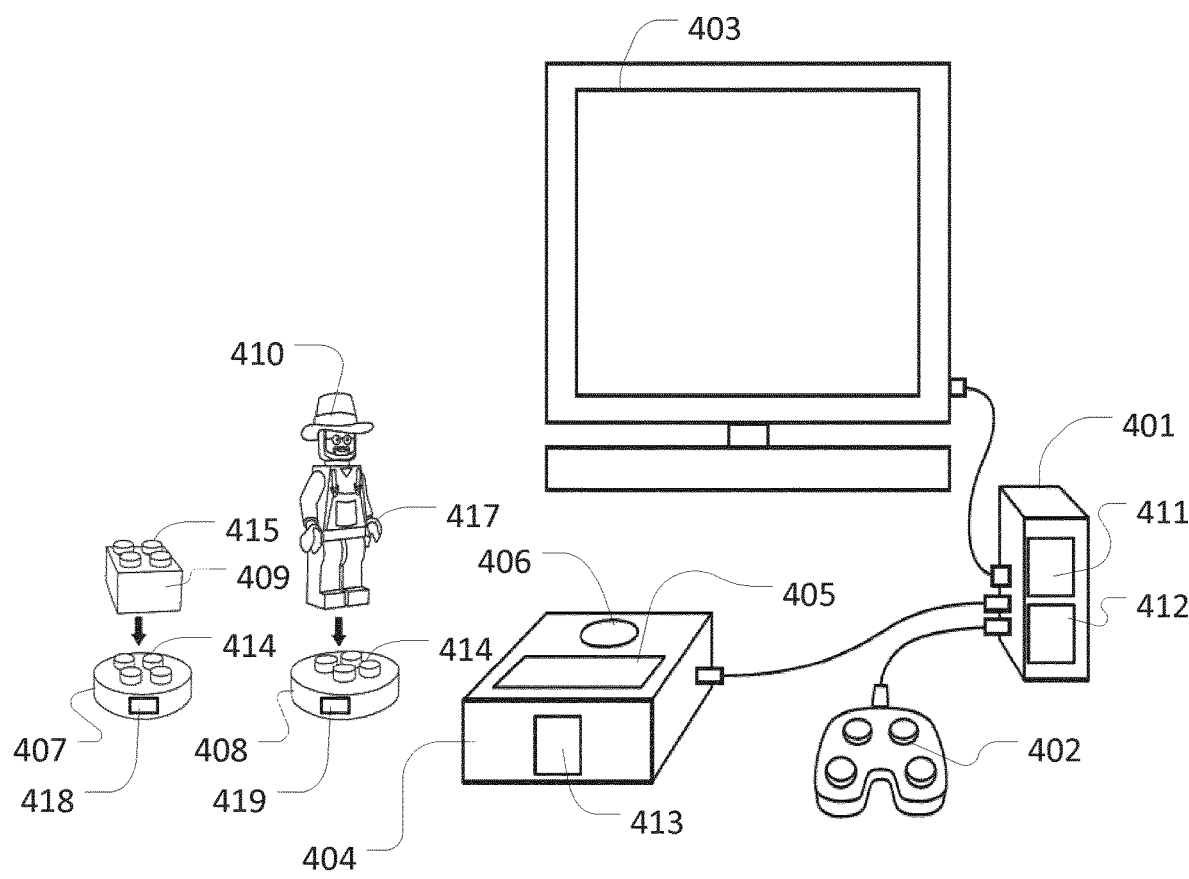
*FIG. 4*

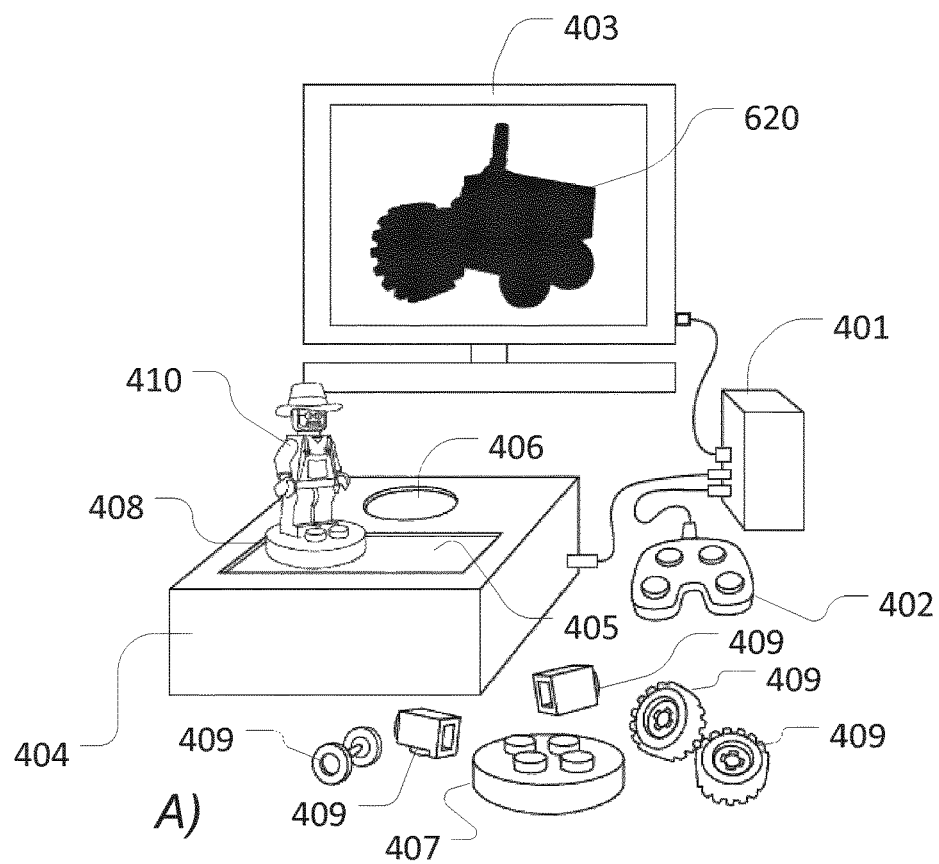
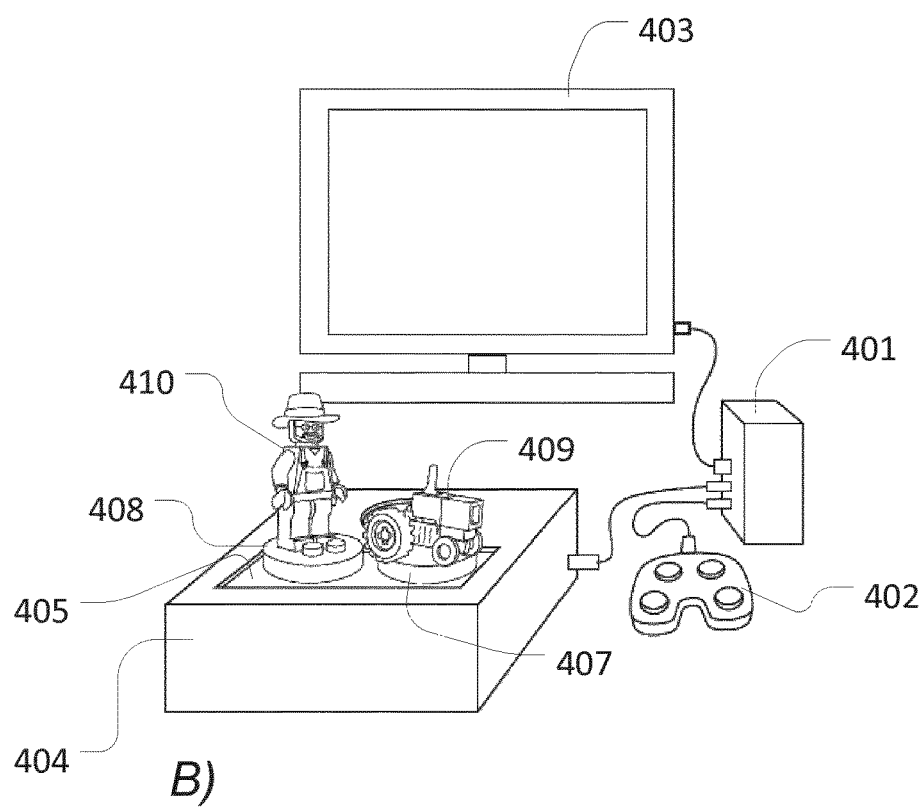
FIG. 6

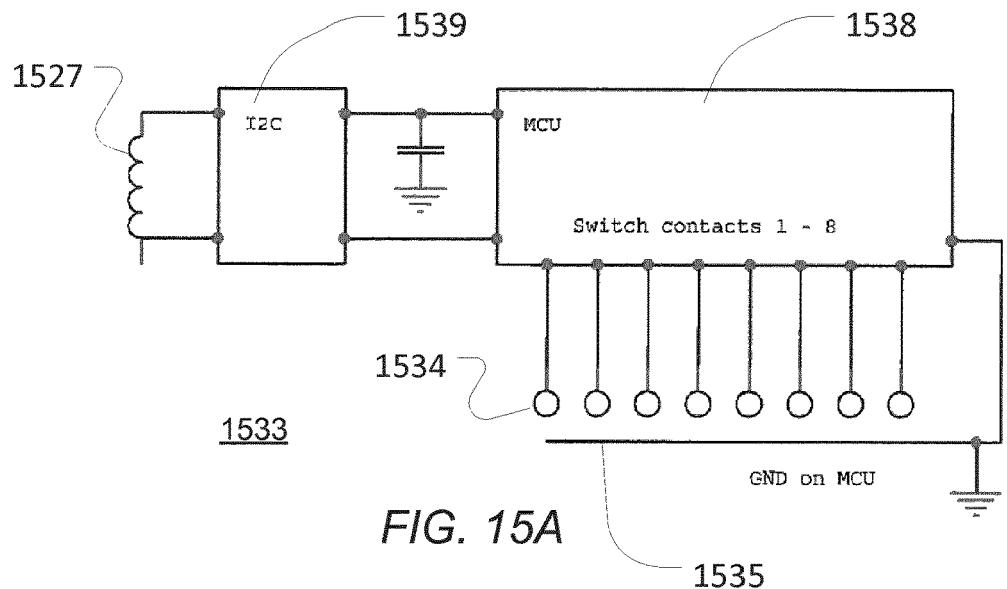
FIG. 15A
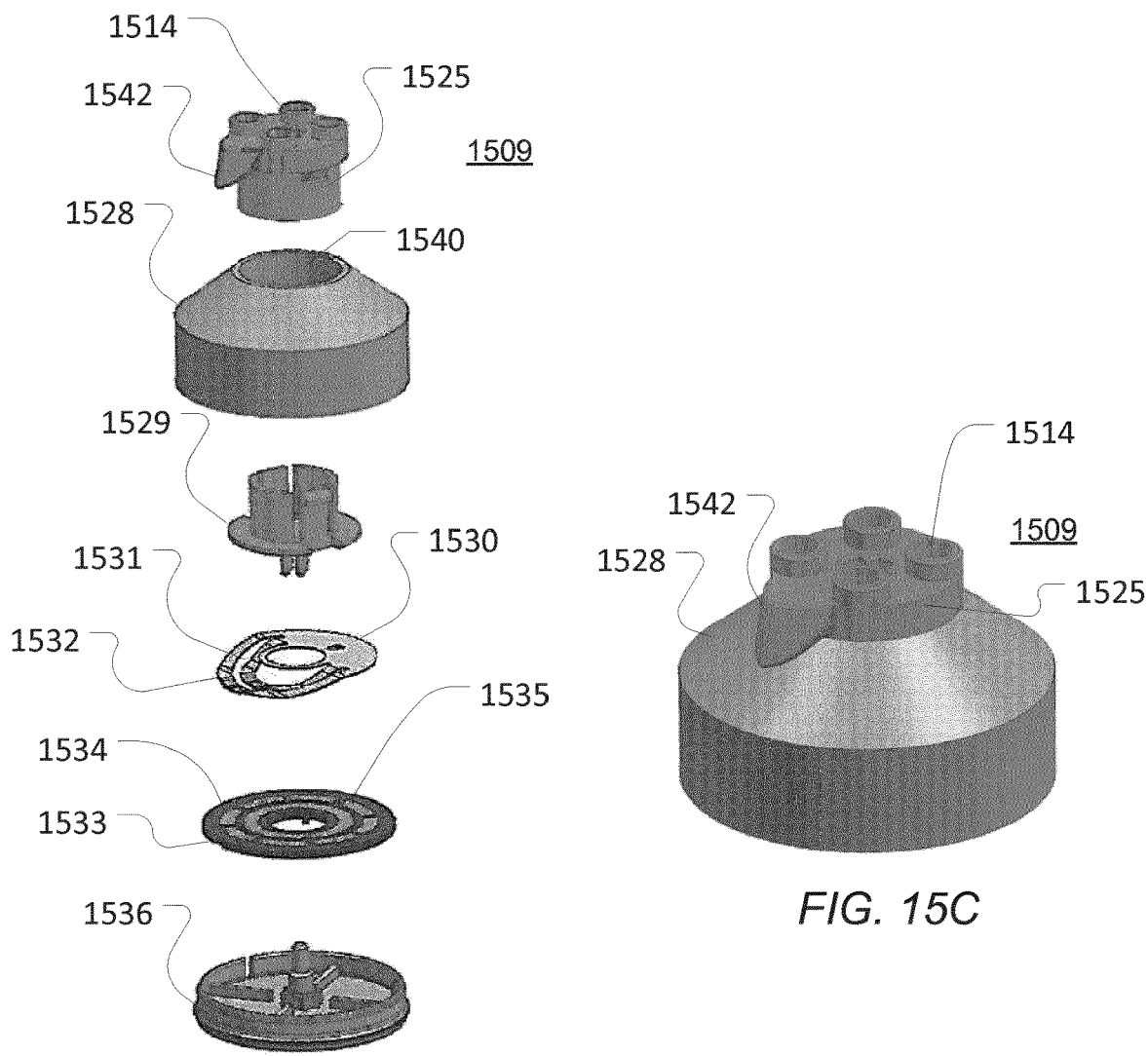
FIG. 15B
FIG. 15C

GAME SYSTEM

CROSS-REFERENCE TO RELATED APPLICATIONS

This application is a continuation of U.S. application Ser. No. 15/563,832, filed on 2 Oct. 2017, which is a National Stage Entry of International Application No. PCT/EP2016/057592, filed on 7 Apr. 2016 and published on 13 Oct. 2016, as WO 2016/162403 A1, which claims the benefit of priority to Danish Patent Application No. DK PA201570204, filed on 8 Apr. 2015. The content of each of the above referenced patent applications is incorporated herein by reference in its entirety for any purpose whatsoever.

FIELD OF THE INVENTION

The invention relates to game systems.

BACKGROUND

Game systems and, in particular, game systems in which a user operates a virtual character in a virtual environment have become increasingly popular among children and adult users. Varies such game systems exist which may be implemented by a data processing system such as a game console, a handheld game device, a desktop computer, a portable computer, a tablet computer or mobile phone. It is generally desirable to make such systems increasingly interesting, entertaining and/or educational.

Several attempts have been made to control virtual game play by means of physical toys. For example, UK patent application GB 2365796 discloses a game system which comprises a toy which stores toy information and a reader for detecting the toy information by a contact-less data transmission system, and a game device. The game device executes a game in which a character representing the toy appears in accordance to the toy information detected by the reader.

In many game systems, a variety of virtual objects may become available to the player during game play, e.g. when virtual objects evolve to more advanced objects, when a player obtains virtual equipment, etc. Hence, during virtual game play, it is desirable to be able to represent different virtual objects by corresponding physical objects. It is further desirable to provide the user with additional control options for controlling game play.

SUMMARY

According to a first aspect, disclosed herein are embodiments of a game system, comprising:
 a data processing system configured to execute program instructions allowing a user to engage in digital game play;
 a physical toy; and
 a detection device configured to detect a presence of the toy within a detection area of the detection device;
wherein the toy comprises two or more identification elements each detectable by the detection device when the identification element is positioned within the detection area, wherein the toy is configured to allow a user to selectively position the toy with a user-selected subset of one or more of said identification elements within the detection area; and wherein the data processing system is configured to control said digital game play responsive to the detected subset of identification elements.

The subset of identification elements may be a single identification element or a plurality of identification elements but fewer than the total number of identification elements included in the physical toy, i.e. the subset may be a true subset; the subset may even comprise all identification elements included in the physical toy. The toy is configured such that the user may position the toy selectively with only a subset of identification elements within a detection area of the detection device, while the identification elements (if any) that are not part of the user-selected subset are not within a detection area of the detection device. In some embodiments, the physical toy is configured such that the toy, at least in one configuration, can only be positioned with a true subset of the identification elements, e.g. only a single identification element, at a time within a detection area. In some embodiments the identification elements of the subset can be positioned within the same detection area of the detection device. In some embodiments, the detection device comprises more than one detection areas and the toy may be configured so as to allow a user to position the toy with a subset of the identification elements in respective ones of the detection areas, i.e. not necessarily within the same detection area.

The physical toy may be a coherent structure where the two or more identification elements are physically interconnected with said structure, e.g. mounted on, integrated into or the like. Some or all of the identification elements may be detachably attached to the structure, e.g. such that they may repeatedly be attached to and detached from the same toy and/or to different toys, e.g. at the same or at different positions on the toy. Alternatively or additionally, some or all of the identification elements may be integrated into the structure such that they cannot be removed or detached from the structure.

In some embodiments, the physical toy is a toy construction model constructed from a plurality of construction elements, such that the construction elements are interconnected with each other in a detachable manner so as to form a coherent structure.

In some embodiments, the toy structure comprises a first part and a second part that are movably interconnected with each other, e.g. hinged relative to each other, rotatable relative to each other, slidable or otherwise movable relative to each other. The first part may comprise a first one of the two or more identification elements and the second part may comprise a second of the two or more identification elements. The second part may be brought into a first position relative to the first part such that, when the first identification element is positioned within a detection area of the detection device, the second identification element is not within a detection area of the detection device. The second part may be brought into a second position relative to the first part such that, when the first identification element is positioned within a detection area of the detection device, the second identification element is also within the same or a different detection area of the detection device. The first and second parts may be brought into respective positions relative to each other such that the identification elements are selectively positionable within the same or within different detection areas. For example, the parts may be moved so as to adjust the relative distance between the identification elements from each other, e.g. between a first configuration such that the identification elements are close to each other and fit within the same detection area, and a second configuration in which the identification elements are further away from another and can simultaneously be positioned in respective detection areas.

The identification elements may comprise information relating to the identification element and/or relating to the physical toy, e.g. an identifier identifying the identification element and/or the physical toy. The information may be stored in a memory comprised in the identification element. In some embodiments, the identification elements may comprise the same or different information. In particular, they may comprise the same identifier indicative of the physical toy. Alternatively or additionally, they may comprise respective identifiers, different from the corresponding other identification element, e.g. an identifier indicative of the respective identification element, e.g. a unique identifier of the identification element allowing a detection device to distinguish between the identification elements included in the toy. Hence, the reader may be configured to determine which one or more identification elements of the toy are currently within a detection area of the detection device.

In some embodiments, the detection device comprises at least two detection areas and the detection device is configured to detect the presence of an identification element within each of the detection areas and to detect which detection area an identification element is placed within. The physical toy may be configured such that the identification elements may be selectively positioned within a single one of the detection areas and/or within respective ones of the detection areas; and the detection device may be configured to determine whether the physical toy is positioned with one, two or more identification elements within the same detection area or with the identification elements being placed within respective detection areas. The data processing system may thus be configured to control said digital game play responsive to the detected subset of identification elements and, optionally, responsive to whether the detected subset is detected within the same detection area or whether respective identification elements of the detected subset are detected within different detection areas Generally, the control of the digital game play dependent on the detected subset may comprise providing access to digital content associated with the detected subset, controlling the behaviour of a digital character or a digital item responsive to the detected subset, modifying the way a user-controllable digital character reacts on a user input, etc. and/or a combination thereof.

The present disclosure relates to different aspects including the game system according to the first aspect described above and in the following, additional game systems according to further aspects described below and to corresponding apparatus, systems, methods, and/or products. Each aspect may yield one or more of the benefits and advantages described in connection with the first mentioned aspect or with one of the other aspects, and each aspect having one or more embodiments corresponding to the embodiments described in connection with one of the other aspects and/or as disclosed in the appended claims.

In particular, according to a second aspect, disclosed herein are embodiments of a game system, comprising:
- a data processing system configured to execute program instructions allowing a user to engage in digital game play;
- a physical toy; and
- a detection device configured to detect a presence of the toy within a detection area of the detection device;
wherein the physical toy is configured to transmit information to the detection device when the physical toy is positioned in the detection area of the detection device; wherein the physical toy comprises a sensor configured to detect an input and wherein the physical toy is configured to alter said transmitted information responsive to the detected input; and wherein the data processing system is configured to receive a detection signal from the detection device indicative of the information transmitted by the physical toy and to control said digital game play responsive to the received detection signal.

The sensor may be a user-controllable input, such as a user-controllable actuator, e.g. a push button, a pull button, a rotatable actuator, a linear switch, a terminator connector, an accelerometer, etc. Alternatively, the sensor may be a sensor detecting an environmental condition, e.g. a light sensor, an acoustic sensor, a transducer, a thermometer, a proximity sensor, a vibration/shake sensor, a rotation sensor, a pressure sensor, a force sensor, a gyro sensor, a GPS device, a magnetic field sensor, an infrared sensor, a radio frequency signal sensor, etc.

The transmitted information may be altered in a variety of ways: For example, e.g. as described in connection with the first aspect, the physical toys may comprise one or multiple identification elements that may selectively be brought within a detection area of the detection device when the physical toy is placed in a predetermined proximity of the detection device, e.g. placed on a contact surface of the detection device. Alternatively or additionally, the one or more identification elements or parts thereof may be selectively disabled and enabled, e.g. by selectively connecting/disconnecting an identification element, or a part thereof, to a power supply and/or to a communications circuit and/or antenna, and or the like. Yet alternatively or additionally, the physical toy may comprise one or more identification elements comprising a memory for storing information, e.g. as described in connection with the first aspect; the identification element may thus be configured to transmit the stored information to the detection device, and the identification element may be configured to alter the stored information responsive to the input detected by the sensor.

The physical toy may be a coherent structure, e.g. a toy construction model and, optionally, having first and second parts movable relative to each other, e.g. as described in connection with the first aspect.

The detection device may comprise one or more detection areas, e.g. as described in connection with the first aspect.

According to a third aspect, disclosed herein is a game system comprising:
- a data processing system configured to execute program instructions allowing a user to engage in digital game play;
- two or more identification elements; and
- a detection device comprising two or more detection areas and configured to detect a presence of at least one of the identification elements in each of the detection areas of the detection device;
wherein the data processing system is configured to receive an input signal from the detection device indicative of the presence of two or more of the identification elements in the respective detection areas and to control said digital game play responsive to whether the two or more identification elements are detected in the same or in different ones of the detection areas.

The identification elements may be included in the same or in multiple respective physical toys. Each physical toy may be a coherent structure, e.g. a toy construction model and, optionally, having first and second parts movable relative to each other, e.g. as described in connection with the first aspect. For example, when the user places two identification elements, which may be included in two separate physical toys or in a single physical toy, within a single detection area or within different detection areas of the detection device, the data processing system may control game play responsive to whether the identification elements are positioned in the same detection area or within different detection areas. For example, if a user places two physical toys, each including an identification element and each resembling a creature, in respective detection areas, the data processing system may introduce two digital creatures into the digital game play. In some embodiments, the two creatures may be introduced into respective regions or be associated with respective players, or be controllable independently from each other by a user, etc. If, on the other hand, the user places the same two toys within the same detection area, the data processing may control digital game play in a different way, e.g. introduce a single creature, e.g. a larger creature, a more evolved creature, a creature with different capabilities, and/or the like, or the data processing system may introduce a pair of creatures that may only be controlled as a pair by the user, or that are controllable to cooperate with each other, and/or the like.

According to a fourth aspect, disclosed herein is a game system comprising:
  a data processing system configured to execute program instructions allowing a user to engage in digital game play;
  one or more identification elements; and
  a detection device comprising two or more detection areas and configured to detect a presence of the identification elements in each of the detection areas of the detection device;
wherein the digital game play comprises a digital environment including two or more regions; wherein the regions may be explored by a user-controllable character; and wherein the data processing system is configured to control game play in a first one of said regions responsive to detecting the identification element in a first one of the detection areas and to control game play in a second one of said regions responsive to detecting the identification element in a second one of the detection areas.

The digital environment may comprise a space that may comprise landscapes, structures, buildings, and/or other forms of spaces in which a digital character, e.g. a user-controllable digital character, can move around. The different regions may be interconnected such that the digital character may move from one region to the other. In some embodiments, there may be one or more entrances and/or exits into/from a region. An entrance to a region may comprise a structure or item marking the entrance, such as a gate, a door, stairs, a bridge, a passageway, and/or the like.

The respective detection areas of the detection device may thus be associated with respective ones of such regions. Such association may be permanent or the association may change during game play, e.g. responsive to user inputs, game events, etc. For example, upon detection of the presence of an identification element in one of the detection areas, the data processing system may cause a digital character or item corresponding to the detected identification element to appear in a region of the digital environment that is currently associated with said detection area. The identification element may be interconnected with a physical toy, e.g. as described with one of the above aspects. The identification element may comprise information, e.g. stored in a memory, e.g. as described in connection with one of the other aspects.

According to the fourth aspect and/or according to some embodiments of the other aspects, the detection device comprises two or more detection areas, e.g. as described in connection with one or more of the above aspects. Each or only some of the detection areas may be associated with respective ones of the regions of the digital environment, and detection of respective identification elements in two detection areas may cause the data processing system to control the digital game play so as to affect both regions, e.g. by opening a passage, such as a shortcut, from one region to the other. The respective identification elements may be identification elements included in the same physical toy or in separate toy elements. The identification elements may have a common identifier associated with them or they may comprise different identifier or otherwise different information, e.g. as described in connection with one or more of the other aspects disclosed herein.

Generally, in some embodiments of each of the aspects described herein, the identification element may be a toy construction element comprising one or more connectors configured for mechanically connecting one or more other toy construction elements to the identification element so as to allow a user to construct a toy construction model. Accordingly, a user may change the visual appearance of the physical toy construction model that is connected to the identification element by attaching one or more toy construction elements to the identification element. Consequently, the user may adapt the visual appearance of the toy construction model so as to make it more easily recognizable for the user which virtual object a given physical object corresponds to.

Moreover, a given identification element does not need to have any easily recognizable, specific appearance but may be provided as a generic element which the user may easily customize. This reduces manufacturing costs of the identification elements.

Moreover, the game system can easily be maintained e.g. when new types of virtual objects are added, as existing identification elements may be reused.

Embodiments of the resulting game system further provide an interesting game play, as the user may be provided with a high degree of freedom of designing the physical objects to be detected by the game system.

The toy construction elements may be toy construction elements of a toy construction system that comprises one or more different types of mutually interconnectable toy construction elements. The toy construction elements may be elements of an existing toy construction system. Hence, the user may reuse existing toy construction elements to construct physical toys which correspond to virtual objects in a virtual environment. Nevertheless, the game system may comprise a plurality of toy construction elements, each comprising one or more connectors configured for detachably interconnecting the toy construction elements with each other and/or with the identification element. For example, a toy construction set may comprise toy construction elements in a sufficient number, shape and size so as to allow a user to construct toy construction models that resemble one or more virtual objects of a game system.

In some embodiments of each of the aspects described herein, one or more of the toy construction elements have a top surface, a bottom surface, and connectors placed on at least one of the top and the bottom surface, so as to allow a vertical stacking of toy construction elements. Alternatively or additionally, toy construction elements may comprise connectors on one or more of its side faces so as to allow lateral/horizontal interconnection of toy construction elements. The toy construction elements may have a uniform height, or an integer multiple of a uniform height, defined between the top and bottom surfaces.

The connectors may be configured to allow interconnection of each construction element with another construction element in a discrete number of predetermined relative orientations relative to the construction element. Consequently, a large variety of possible building options are available while ensuring interconnectivity of the building elements. The connectors may be positioned on grid points of a regular grid; in particular, the connectors of the toy construction elements may be arranged such that the connectors of a set of mutually interconnected toy construction elements are positioned on grid points of a three-dimensional regular grid. The dimensions of the toy construction elements may be defined as integer multiples of a unit length defined by the regular grid. It will be understood that a three-dimensional grid may be defined by a single unit length, by two unit lengths, e.g. one unit length applicable in two spatial dimensions while the other unit length is applicable in the third spatial dimension. Yet alternatively, the three-dimensional grid may define three unit lengths, one for each spatial dimension.

The connectors may utilise any suitable mechanism for detachably connecting construction elements with other construction elements. In some embodiments, the connectors comprise two or more types of connectors configured for a mating engagement with each other, e.g. in a plug-and-socket or male-female fashion. Different surfaces of the toy construction element may comprise respective types of connectors. In some embodiments, the connectors comprise one or more protrusions and one or more cavities, each cavity being adapted to receive at least one of the protrusions in a frictional engagement.

Some embodiments of a game system according to one of the aspects disclosed herein allow a user to construct a large variety of toy construction models in a uniform and well-structured manner and with a limited set of different types of toy construction elements. In some embodiments, the game system comprises a plurality of toy construction elements and the data processing system may be configured to create a virtual object that resembles a toy construction model constructable from the plurality of toy construction elements. Consequently, the user may construct a toy construction model including the identification element such that the construction model resembles the virtual object it is associated with. The user may thus easily recognise which virtual object a physical toy construction model represents. It will be appreciated that the degree of resemblance may vary. For example, the representation of the virtual object presented by the data processing system may depict a construction model constructed from toy construction elements. In some embodiment the representation of the virtual object may depict a toy construction model constructed from the same construction elements as included in the game system for construction of the toy construction model, optionally with or without a representation of the identification element. In other embodiments the representation of the virtual model may depict a larger model constructed from a larger number of toy construction elements providing a more detailed or realistic shape of a given object. In yet other embodiments, the virtual representation may be depicted as an animated object without depicting individual toy construction elements.

The detection device may use any suitable mechanism for detecting the presence of a physical toy or other type of identification element within a detection area of the detection device. The detection mechanism may require electrical connection of the identification element or it may be a contact-less detection mechanism, e.g. based on radio-frequency signals, optical detection and/or another detection technology. The size and/or shape of the detection area is normally defined by the detection technology employed and by the detection device implementing the detection technology. The detection device may be an integral part of the data processing system or a separate device, e.g. a computer peripheral, connectable to the data processing system via a wired or a wireless connection. For the purpose of the present description the detection device will also be referred to as a reader, as some embodiments of the detection device also perform the accessing of information associated with a physical toy or another type of identification element. The detection device may comprise an electrical connector for electrically connecting the identification element; alternatively, the detection device may comprise an antenna or other sensor for contact-less detection of the identification element. In the first example, the detection area may thus be defined by the electrical connector while the detection area in the second example may be defined by the reception range of the antenna or other contact-less sensor. The detection device may define a detection or contact surface on which the identification element may be placed for the purpose of detection; in some embodiments, the detection device may be configured to only detect the identification element when it is positioned in contact with the surface and/or within a close proximity of the surface, e.g. within 10 cm or less from the surface, such as 5 cm or less. Said surface may thus define the detection area. The detection/contact surface may be an exterior surface, e.g. a top surface, of a housing of the detection device. The detection technology may further allow the data processing system to access, via the detection device, information included in the physical toy or in another type of identification element. Alternatively, the information access may use a separate technology; the information access technology may use e.g. a radio-frequency data communication, a wired data communication, an optical information access technology and/or the like. In some embodiments, the detection technology and/or the information access technology is a two-way technology allowing the data processing system to communicate information to the identification element, e.g. so as to alter, replace and/or supplement the information included in the identification element. In some embodiments, the detection and information access is based on near-field communication (NFC) or radio-frequency identification (RFID).

In some embodiments, the detection device comprises a processor and/or other circuitry implementing the detection mechanism and a communications interface with the identification element. The processor and/or other circuitry may further implement a communications interface with the data processing system. The detection device may comprise connectors for mechanically connecting the toy construction elements to the detection device so as to allow a user to construct a toy construction model which includes the detection device as an integral part, e.g. a model resembling a landscape, an arena, a portal or other structure associated with the virtual environment. Hence placing a toy construction model with an identification element within the detection area of the detection device resembles placing the toy construction model within a landscape, arena etc.

In some embodiments, a physical toy may be detachably connected to the detection device using connectors of the toy construction system. Hence, a position of at least a first part of the physical toy relative to the detection area(s) of the detection device may be fixed. Consequently, when the physical toy comprises a second part, movably arranged relative to the first part, wherein the second part comprises an identification element, movement of the identification element into/out of a detection area may be performed in a controlled and reliable manner. The connectors of the detection device may be included in a part of the surface that comprises one or more of the detection areas, e.g. a top surface or a side surface of a housing of the detection device.

Generally, movement of an identification element relative to a detection area may comprise altering the distance between the detection area and the identification element and/or altering a relative orientation between the identification element and the sensor. For example, detection of an identification element within the detection area may be performed by a sensor having a predetermined detection range. Hence movement of the identification element may include movement of the identification element into/out of the detection range of the sensor. Similarly, the sensor may define a detection direction, e.g. a predominant direction of detection. For example, e.g. in the case of an RFID reader, the sensor may comprise a coil antenna arranged in or below the detection area and defining an axial direction of the coil, e.g. a direction out of the detection surface, such as normal to the detection surface. The identification element may also define an identification direction, and movement of the identification element may include aligning the identification direction with the detection direction. For example, e.g. in the case of RFID identification elements, the identification element may also comprise a coil antenna defining an axial direction. Aligning the axial directions of the sensor antenna and the antenna of the identification element may cause the identification element to become detectable by the sensor. Similarly, movement of a first identification element relative to a second identification element may comprise altering the distance between the identification elements and/or a relative orientation, e.g. the relative orientation of the identification axes of the respective identification elements. For example, two identification elements may be moved so as to cause their identification axes to selectively become substantially parallel or substantially orthogonal relative to each other.

The data processing system may be configured to create an association between an identification element and a virtual object. In particular, in some embodiments, the data processing system may be configured to:
  detect a presence of the identification element within a detection area;
  create an association between a virtual object in a virtual environment and the detected identification element;
  access, when the identification element is again placed within a detection area, the information associated with the identification element;
  present a representation of the associated virtual object based on the accessed information; and
  perform a play pattern procedure including controlling the representation of the virtual object.

This association may be created at least in part responsive to a game event, e.g. responsive to a user input such as a user input indicative of a selection of a virtual object to be associated with an identification element. The game event may include an unlocking of a new virtual object, such as an evolved variant of a current virtual object or an entirely new type of virtual object. A game event may involve the game having reached a certain stage, a player having obtained a certain number of credits, in-game currency or other type of rewards, etc., a user selecting a new virtual object from a list of available virtual objects, and/or the like. In some embodiments the data processing system is configured, responsive to a game event, to replace an existing association between the identification element and a virtual object with a new association between a new virtual object and the identification element such that the data processing system presents a representation of said new virtual object and perform a play pattern procedure including controlling the representation of the new virtual object when the data processing system again detects the presence of the identification element within a detection area. Consequently, a user may associate the identification element with successive virtual objects. The user may thus selectively construct different toy construction models using the identification element, each toy construction model having a respective virtual object associated with it.

The various aspects described herein may be implemented with a variety of computer-implemented digital games, e.g. comprising a computer-generated virtual environment in which virtual objects are controlled by a data processing system. Program instructions allowing a user to engage in digital game play may e.g. be provided in the form of a video game application. Generally, a virtual object may be an animate or an inanimate object. The virtual object may be a completely autonomous object or an object whose actions are partly or completely responsive to user inputs. Examples of inanimate virtual objects include a building, a vehicle, a weapon or other accessory or equipment, etc. A virtual object may be stationary or movable within the virtual environment. For example, an object may be carried, worn or otherwise moved by a virtual character and/or controlled to be moved by the user, e.g. a car or other vehicle being controlled in a car racing game. A virtual object may comprise movable parts, such as doors, or the like and/or other modifiable parts.

A virtual object may represent a virtual character or other animate object, such as a human-like character, an animal-like character, a fantasy creature, etc. In some embodiments, virtual objects whose counterparts in the physical world are inanimate—e.g. a car—may be used as an animate virtual object or character in a virtual environment. Hence, in some embodiments the virtual object is a virtual character and, in some embodiments, the virtual object is an inanimate object.

A virtual character may exhibit behaviour by moving around within the virtual environment, by interacting with or generally engaging other virtual characters and/or inanimate virtual objects present in the virtual environment and/or the virtual environment itself and/or by otherwise developing within the virtual environment, e.g. growing, aging, developing or loosing capabilities, attributes or the like. Generally, virtual objects may have attributes, e.g. one or more capabilities that influence the game play or other evolution of a virtual environment. For example, a car may have a certain maximum speed, or an object may have an attribute that determines whether or how a virtual character may interact with the virtual object, and/or the like.

Hence, a computer-generated virtual environment allowing a user to engage in digital game play may be implemented by a computer program executed on a data processing system and causing the data processing system to generate a virtual environment and to simulate the evolution of the virtual environment over time, including the behaviour of one or more virtual characters and/or the attributes of one or more virtual objects within the virtual environment. A computer-generated virtual environment may be persistent, i.e. it may continue to evolve and exist even when no user interacts with it, e.g. between user sessions. In alternative embodiments, the virtual environment may only evolve as long as a user interacts with it, e.g. only during an active user session. A virtual object may be at least partly user-controlled, i.e. the data processing system may control the behaviour of a virtual object at least partly based on received user inputs. A computer-generated virtual environment may be a single-user environment or a multi-user environment. In a multi-user environment more than one user may interact with the virtual environment concurrently, e.g. by controlling respective virtual characters or other virtual objects in the virtual environment. Computer-generated virtual environments and, in particular, persistent, multi-user environments are sometimes also referred to as virtual worlds. Computer-generated virtual environments are frequently used in game systems, where a user may control one or more virtual characters within the virtual environment. A virtual character controlled by the user is sometimes also referred to as "the player." It will be appreciated that at least some embodiments of the aspects described herein may also be used in contexts other than game play. Examples of computer-generated virtual environments may include but are not limited to videogames, e.g. games of skill, adventure games, action games, real-time strategy games, role play games, simulation games, etc. or combinations thereof.

The game system may present a representation of the virtual environment including a representation of one or more virtual objects such as virtual characters within the virtual environment. The virtual environment and/or the virtual objects may be presented as two or three-dimensional graphical representations on a display of the data processing system. A user may access a computer-generated virtual environment so as to view the graphical presentation and/or so as to interact with the computer-generated virtual environment.

Generally, information associated with a physical toy or with another type of identification element may include an identifier of the identification element. The data processing system may thus create an association to a virtual object by storing the identifier in association with an identifier of the virtual toy construction element. The data processing system may store this association in a storage device of the data processing system or otherwise accessible by the data processing system. The storage medium of or accessible by the data processing system may be a memory or storage device included in or connected to the data processing system. Alternatively or additionally, the data processing system may store an identifier of the virtual object in a memory of the identification element. The memory of the identification element may comprise any suitable storage medium, such as an EPROM, EEPROM, NVRAM etc. The memory may be read-only or rewritable.

In some embodiments, the information associated with the identification element may include information about the virtual object such as an identifier of the virtual object. The data processing system may thus create an association to a virtual object by storing the information about the virtual object in a memory of the identification element. For example, the memory of the identification element may include an identifier of a virtual object associated with the identification element.

In some embodiments the data processing system is configured to present building instructions for constructing, from the toy construction elements of the game system, a toy construction model resembling or otherwise representing the virtual object and connectable to the identification tag element. Consequently, the game system provides guidance assisting the user in constructing a toy construction model that resembles or otherwise represents the virtual object. The building instructions may be presented in any suitable form, e.g. as an animation, a video, a series of pictures, as text, and/or a combination of the above. For example, the building instructions may be presented responsive to a game event and/or a user input.

A game system may comprise multiple identifiable physical toys and/or multiple other identification elements. A game system may further comprise multiple toy construction elements which allow the user to construct multiple toy construction models for use in the game system. However, it may be desirable to limit the user's freedom to freely use any identification element at any point of the game play. For example, the user may otherwise choose to dismantle a previously constructed toy construction model and reuse the corresponding identification element for the purpose of constructing a new toy construction model resembling a recently unlocked virtual object. However, the user may later need the now dismantled toy construction model to complete the game play, as in some embodiments, use of a virtual object may be conditioned on detection of an identification element to which the virtual object has been associated. Hence, the user may need to create a corresponding new association with an identification element to be able to use a virtual object again, thus resulting in a potentially frustrating game experience. In some embodiments, the game system comprises a first and a second identification element each including information associated with the respective identification element; wherein the data processing system is configured to unlock/enable one or more new virtual objects responsive at least to detecting the first identification element; wherein the second identification element comprises one or more connectors configured for connecting one or more toy construction elements to the second identification element so as to allow a user to construct a toy construction model; and wherein the data processing system is configured to create an association between one of the unlocked virtual objects and the second identification element responsive at least to detecting the first and the second identification elements in the same or different detection areas. Consequently, the system provides a mechanism for effectively guiding the user in using selected identification elements of a set of identification elements. In particular, as creating the association with the second identification element requires the presence also of the first identification element (which has an existing association), inadvertent overwriting of the existing association may be prevented. In some embodiments, the first identification element is associated to a virtual character while the second identification element is associated with an inanimate object, such as an accessory for use by the virtual character.

In some embodiments, the game system comprises a detection device defining a first detection area and a second detection area, different from the first detection area. The detection device may be configured to access information associated with an identification element detected within the first detection area; the detection device may further be configured to transmit information associated with an identification element to an identification element detected within the second detection area for storage of the transmitted information by the identification element. Hence, the first detection area may be a read area, e.g. a read-only area, while the second detection area may be a write area, e.g. a write-only area or an area that allows both reading and writing of information from/to identification elements. At least some of the identification elements may be operable to be selectively placed on each of the detection areas and to interact with the detection device via each of the detection areas. The provision of separate, dedicated detection areas for detecting and for writing information, respectively, reduces the risk that a user inadvertently overwrites information of an identification element or causes reading of an erroneous identification element. This risk may further be reduced when the data processing system is configured to send information to an identification element for storage only when said identification element is positioned within the second detection area and when another, e.g. a predetermined, identification element is detected within the first detection area. In some embodiments, some identification elements are associated with a fixed virtual object such that the association cannot be altered by the user, e.g. by storing information about the associated virtual object in a read-only memory of the identification element. Other identification elements may be rewritable, i.e. their associations may be altered by the user. In some embodiments, the game system is configured to only allow a user to alter associations between inanimate virtual objects and identification element, while associations between identification elements and virtual characters are fixed/read-only.

In some embodiments, the identification element has the form of a base plate for supporting a toy construction model and for placement of the toy construction model within a detection area of the game system. The base plate may comprise one or more connectors on its upper surface allowing a user to position and connect one or more toy construction elements on top of the base plate. The base plate may include an electronic circuit including, e.g. including one or more of the following: a processor, and antenna, a memory, an RFID circuit, and/or the like.

The data processing system may comprise or be connectable to a computer-readable medium from which a computer program can be loaded into a processor, such as a CPU, for execution. The computer-readable medium may thus have stored thereon program code means adapted to cause, when executed on the data processing system, the data processing system to perform the steps of the method described herein. The data processing system may comprise a suitably programmed computer such as a portable computer, a tablet computer, a smartphone, a PDA, a game console, a game device, or another programmable computing device having a graphical user-interface. In some embodiments, the data processing system may include a client system, e.g. including a user interface, and a host system which may create and control the virtual environment. The client and the host system may be connected via a suitable communications network such as the internet.

Here and in the following, the term processor is intended to comprise any circuit and/or device suitably adapted to perform the functions described herein. In particular, the above term comprises general- or special-purpose programmable microprocessors, such as a Central processing unit (CPU) of a computer or other data processing system, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

The present disclosure further relates to a method for operating a data processing system, the method comprises performing some or all of the steps disclosed herein as being performed by the data processing system. The present disclosure further relates to a computer program product comprising program code means adapted to cause, when executed on a data processing system, said data processing system to perform the steps of the method described herein that are perform by the data processing system.

The computer program product may be provided as a computer-readable medium, such as a CD-ROM, DVD, optical disc, memory card, flash memory, magnetic storage device, floppy disk, hard disk, etc. In other embodiments, a computer program product may be provided as a downloadable software package, e.g. on a web server for download over the internet or other computer or communication network, or an application for download to a mobile device from an App store.

The present disclosure further relates to a toy construction set comprising a plurality of toy construction elements and one or more identification elements. The toy construction set may further comprise a storage medium having stored therein a computer program product as described herein and/or instructions to obtain a computer program product as described herein. For example, the instructions may be provided in the form of an internet address, a reference to an App store, or the like. Some embodiments of the toy construction set may further comprise a detection device e.g. a peripheral device connectable to a conventional computer via a wired or wireless interface such as via a USB interface.

BRIEF DESCRIPTION OF THE DRAWINGS

FIGS. 1-3 each show a prior art toy construction element.
FIGS. 4-5 illustrate examples of a toy construction system.
FIGS. 6A-B illustrate examples of use scenarios of a game system as described herein.
FIGS. 15A-C show another example of a toy that comprises a sensor.

DETAILED DESCRIPTION

Figure 5:
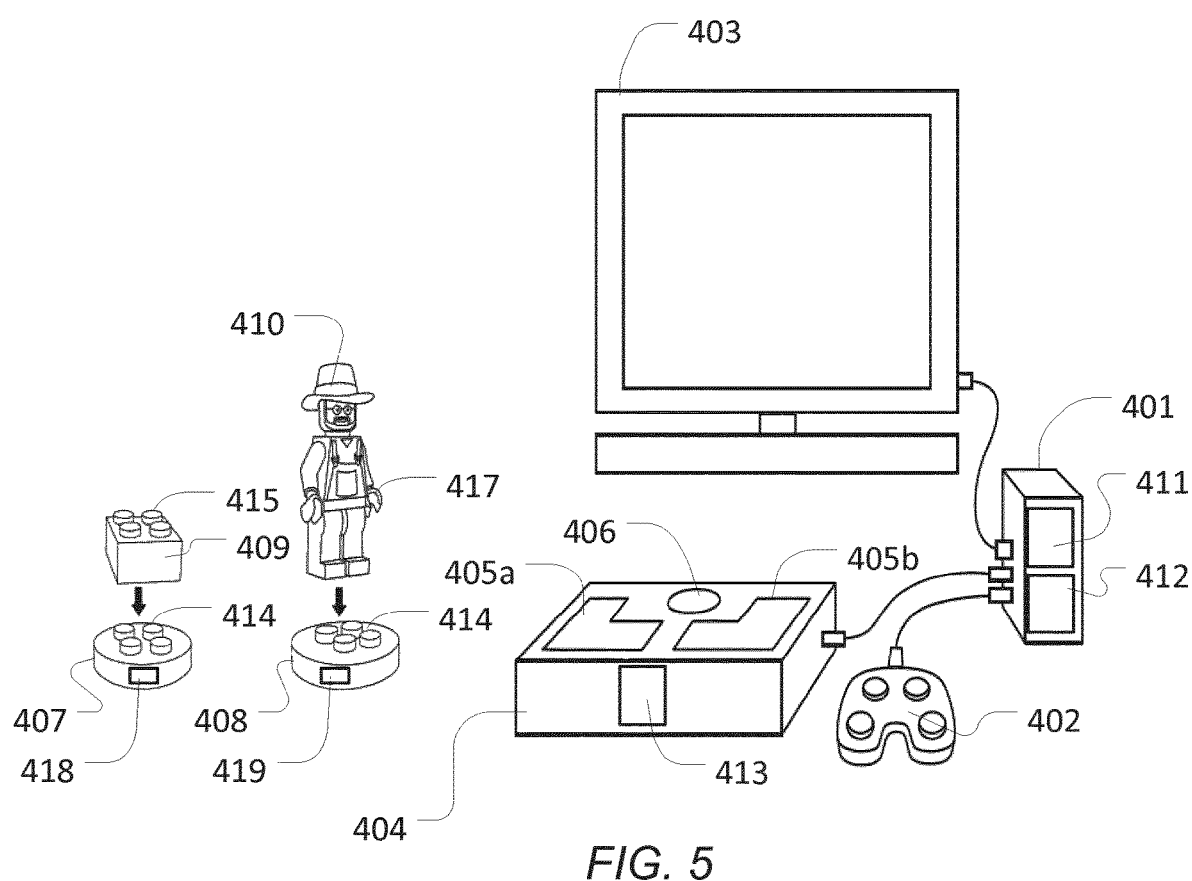

Various aspects and embodiments of game systems and toy construction systems disclosed herein will now be described with reference to toy construction elements in the form of bricks. However, the invention may be applied to other forms of construction elements for use in toy construction sets.

In FIG. 1 is shown a toy construction element with coupling studs on its top surface and a cavity extending into the brick from the bottom. The cavity has a central tube, and coupling studs on another brick can be received in the cavity in a frictional engagement as disclosed in U.S. Pat. No. 3,005,282. FIGS. 2 and 3 show other such prior art construction elements. The construction elements shown in the remaining figures have this known type of connectors in the form of cooperating studs and cavities. However, other types of connectors may also be used in addition to or instead of the studs and cavities. The coupling studs are arranged in a square planar grid, i.e. defining orthogonal directions along which sequences of coupling studs are arranged. The distance between neighbouring coupling studs is uniform and equal in both directions. This or similar arrangements of connectors at coupling locations defining a regular planar grid allow the toy construction elements to be interconnected in a discrete number of positions and orientations relative two each other, in particular at right angles with respect to each other.

FIG. 4 shows an embodiment of a game system. The system comprises a computer 401, an input device 402 connected to the computer, a display 403 connected to the computer, a reader 404 connected to the computer, a number of identification elements 407, 408, and a number of toy construction elements 409, 410.

The computer 401 may be a personal computer, a desktop computer, a laptop computer, a handheld computer such as a tablet computer, a smartphone or the like, a game console, a handheld entertainment device, or any other suitably programmable computer. The computer 401 comprises a processor 411 such as a Central Processing Unit (CPU) and one or more storage devices 412 such as a memory, a hard disk, and/or the like.

The display 403 is operatively coupled to the computer 401 and the computer 401 is configured to present a graphical representation of a virtual environment on the display 403. Though illustrated as separate components in FIG. 4, it will be appreciated that the display may be integrated in the housing of the computer.

The input device 402 is operatively coupled to the computer 401 and is configured to receive user inputs. For example, the input device may comprise a keyboard, a mouse, or other pointing device, and/or the like. In some embodiments, the system comprises more than one input device. In some embodiments an input device may be integrated in the computer and/or the display, e.g. in the form of a touch screen. It will be appreciated that the system may comprise further peripheral computer devices operatively coupled to, such as integrated into, the computer.

The reader 404 is operable to detect one or more identification elements. To this end, the reader defines two detection areas 405 and 406 respectively, and the reader is operable to detect an identification element when positioned in one of the detection areas. The reader comprises one or more RFID circuits 413 and corresponding one or more antennas operable to detect an identification element placed on one of the detection areas. Alternatively, the reader may employ a different detection and data communication technology. In some embodiments the reader may be integrated in the computer and/or the display and/or the input device 402.

The identification elements 407 and 408 have the form of a base plate with connectors 414 on its top surface. The connectors 414 are compatible with the known construction elements described in connection with FIGS. 1-3. The game system further comprises one or more toy construction elements 409 and 410, e.g. of the type described in connection with FIGS. 1-3. While FIG. 4 shows two construction elements, it will be appreciated that a game system may include any number of construction elements. One of the construction elements 409 has the shape of a building block as described in connection with FIG. 1, and another construction element 410 has the shape of a human figure. Both construction elements have connectors—in this example cavities—for attachment to the connectors of the identification elements. Both construction elements have additional connectors 415, 417 allowing a user to connect further construction elements so as to construct a toy construction model comprising multiple construction elements. Each of the identification elements comprises an RFID circuit 418, 419, respectively, operable to receive and store information. If another detection technology is used, the identification element may comprise a corresponding detection circuit or device. In particular, the stored information may identify a virtual object associated with the identification toy construction element. In some embodiments, one or more of the identification elements included in a game system may be manufactured with pre-stored information indicative of a predetermined virtual object. Alternatively or additionally, one or more identification elements may be manufactured without pre-stored information about any specific virtual object. In some embodiments, the game system may comprise one or more toy identification elements where the pre-stored information is read-only, i.e. where the identification element is associated to a fixed virtual object. For example, a game set may comprise one or more read-only identification elements and additionally one or more rewritable identification elements. The read-only and rewritable identification elements may be visually distinguishable from each other; for example, they may have a different size, shape, color, design, etc. The read-only identification elements may be associated with virtual characters of the game, while the game system may allow the user to associate the rewritable identification elements with inanimate virtual objects.

The display 403, the reader 404 and the input device 402 may be operationally coupled to the computer in a variety of ways. For example one or more of the above devices may be coupled to the computer via a suitable wired or wireless input interface of the computer 401, e.g. via a serial or parallel port of the computer such as a USB port, via Bluetooth, Wifi or another suitable wireless communications interface. Alternative, one or all of the devices may be integrated into the computer. For example, the computer may comprise an integrated display and/or input device and/or an integrated detection device. In particular, many tablet computers and smartphones comprise an integrated touch screen operable as a display and input device.

The computer 401 has stored thereon a program, e.g. an App or other software application, adapted to simulate a virtual environment and to create and control virtual objects as described herein.

It will be appreciated that, in some embodiments, the computer 401 may be communicatively connected to a host system, e.g. via the Internet or another suitable computer network. At least a part of the processing described herein may then be performed by the host system. For example, in some embodiments, a host system may generate and simulate a virtual environment, such as a virtual world which may be accessible by multiple users from respective client computers. A user may use a client computer executing a suitable program to detect identification elements and cause the client or the host system to create a corresponding virtual object. The host system may then add the virtual object to the virtual world and control the virtual object within the virtual world.

The user may construct respective toy construction models on top of each of the identification elements which each have the form of a base plate. Alternatively, the identification elements may be incorporated in a toy construction model in a different manner. In use, when the user places an identification element, e.g. with a toy construction model connected to it, on the detection area 405 of the reader, the reader detects the presence of the identification element and accesses the information stored in it, if any. The accessed information comprises information about which virtual object the identification element is associated with or the accessed information allows the computer to otherwise identify the associated virtual object. In some embodiments, the information includes additional information, e.g. indicative of an input to a sensor, as will be described in greater detail below. Responsive to the detection of the identification element in detection area 405, the computer thus creates or otherwise presents a representation of the associated virtual object in a virtual environment. In particular, the computer may create a representation of the associated virtual object on the display and/or allow the user to control or otherwise use or engage the created virtual object in the virtual environment.

When the user positions an identification element, e.g. with a toy construction model connected to it, within the detection area 406 of the reader, the reader detects the presence of the identification element and allows the user to store information about a virtual object on the identification element. Hence, when the user subsequently positions the identification element on the detection area 405, the computer creates or enables the corresponding virtual object as described above. Generally, the detection area 406 may be shaped and/or sized so as to allow a user to only position a single identification element on the detection area 406 so as to allow writing to only a single identification element at a time. For example, the detection area may be formed as a recess having a size and shape corresponding the shape and size of the identification elements, i.e. such that a single identification element may be placed within the recess. To this end the detection area 406 may be recessed into a top surface of the housing of the detection device. Alternatively or additionally, an elevated rim may be formed around the detection area. It will be appreciated that detection area 405 may be shaped and sized so as to allow detection of more than one identification element at a time.

In some embodiments, detection area 406 is selectively used for reading and writing from/to an identification element, but such that upon placement of an identification element on detection area 406, the data processor either only reads data from the identification element or writes data to the identification element. For example, the identification element may comprise multiple memory areas and/r have stored thereon multiple types/categories of information. Upon placement of an identification element within detection area 405, all memory areas and/or data categories may be read but not altered. Upon placement of an identification element within detection area 406 some memory areas and/or data categories may be read but not altered, while other memory areas may be written to but not read from.

FIG. 5 shows another embodiment of a game system. The system of FIG. 5 is similar to the system of FIG. 4 and comprises a computer 401, an input device 402 connected to the computer, a display 403 connected to the computer, a reader 404 connected to the computer, a number of identification elements 407, 408, and a number of toy construction elements 409, 410, all as described in connection with FIG. 4. The system of FIG. 5 differs from the one of FIG. 4 in that the reader comprises three detection areas: A writable detection area 406 as described in connection with FIG. 4 and two read-only detection areas 405a,b each as the detection area 405 of FIG. 4. The provision of two read-only detection areas 405a,b facilitates two-player games or other types of games where two classes of virtual objects are to be distinguished, e.g. objects belonging to two different players, to two different teams, etc. The physical separation of the two detection areas thus provides an easy-to-use mechanism for a user to define members of the two classes of virtual objects by simply placing the corresponding identification element on a selected one of the detection areas 405a,b, where each detection area is associated with one of the classes. It will be appreciated that other embodiments may comprise additional detection areas, e.g. to define more than two classes of objects. In some embodiments, the respective detection areas 405a,b are associated with different regions of a game space or another virtual environment.

FIG. 6 illustrates an example of a use of an embodiment of a game system, e.g. the game system of FIG. 4. In particular, the system of FIG. 6 comprises a computer 401, an input device 402 connected to the computer, a display 403 connected to the computer, a reader 404 connected to the computer, a number of identification elements 407, 408, and a number of toy construction elements 409, 410, all as described in connection with FIG. 4.

In this example one of the identification elements 408 has stored thereon information about a virtual character and the game system comprises a physical toy FIG. 410 resembling the virtual character. In an initial step, the user is instructed to assemble the toy FIG. 410 with the identification element 408. The computer 401 is configured to execute a video game program which comprises a corresponding virtual character that is controllable by a user via input device 402. When the user positions the identification element 408 on the detection area 405 of the reader, the computer detects the identification element, identifies the associated virtual character and causes the associated virtual character to appear in the video game. During game play where the user controls the virtual character, a game event may occur that unlocks certain equipment, in this example a tractor, which the virtual character may use during subsequent game play.

Responsive to the game event, the computer may provide an indication to the user that the user may obtain a virtual tractor (or another virtual object such as other equipment which the virtual character may utilise or otherwise engage in the game play). FIG. 5A shows the game system with the identification element 408 and attached toy FIG. 410 positioned within detection area 405 of the reader 404 and with an indication 620 of the unlocked virtual object displayed on display 403. Optionally, the computer may further provide building instructions for instructing the user how to construct a corresponding toy construction model resembling a tractor from the toy construction elements 409. The user may thus construct a toy construction model and attach it to another identification element 407 of the game system. When the user places the identification element 407 with the newly constructed model on the detection area 406 of the reader 404, the computer stores an identifier and/or other information indicative of the newly unlocked virtual object on the identification element 407. In some embodiments, this process may require the identification element 408 associated with the original virtual character to still be positioned in the detection area 405. The storing of the identification of the new virtual object on an identification element does not require the system to access the currently stored information on the identification element; hence detection area 406 may be operated as a write-only area.

Once the information about the new virtual object is successfully stored on identification element 407, the user may remove the identification element from the detection area 406. When the user subsequently places the identification element 407 on the detection area 405, e.g. together with the identification element 408, as illustrated in FIG. 5B, the computer 401 controls the video game so as to allow the user to control the virtual character associated with identification element 408 and to allow the virtual character to use or otherwise engage a virtual object associated with the identification element 407. For example, the virtual character may now be able to drive a virtual tractor. It will be appreciated that subsequently, the user may create and unlock further virtual objects in a manner similar to the one described above, and the virtual character may then use further equipment or other virtual objects. The further virtual objects may be associated with additional identification elements or the system may create a new association of the identification element 407 with a new virtual object, e.g. a larger tractor or different type of machine. Such new association may then replace the previous association.

It will also be appreciated that, in some embodiments, the data processing system may use detection area 406 for reading data from identification elements, e.g. in a manner similar to detection area 406. For example, upon detection of a placement of an identification element within detection area 406, the data processing system may selectively operate the detection area 406 either as a read-only area or as a write-only area until the identification element is again removed from detection area 406. Upon subsequent placement of an identification element, the processing system may again determine/select, e.g. responsive to user input, game events and/or other conditions, whether to operate detection area 406 as a write-only or as a read-only area until the identification element is again removed from the detection area. It will be appreciated that the selective operation of detection area 406 in a read-only or in a write-only mode may also be implemented in an embodiment with more than two detection areas, e.g. in the embodiment described in connection with FIG. 5.

Figure 7:
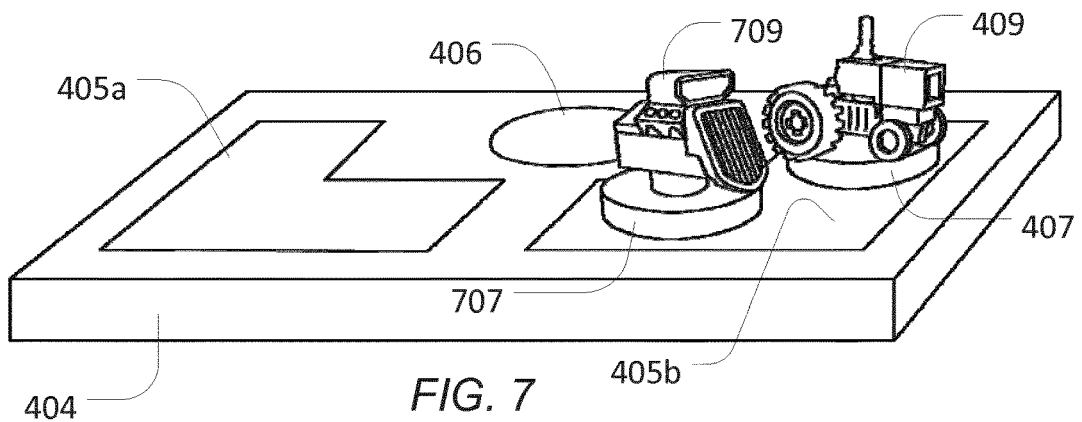
FIG. 7 illustrates another example of the operation of an embodiment of a game system.

FIG. 7 illustrates another example of the operation of an embodiment of a game system, e.g. the game system of one of FIGS. 4-6. In particular, FIG. 7 shows a reader 404. Though not explicitly shown in FIG. 7, the reader 404 may be connected to a computer as described in connection with one or more of the previous figures. The reader 404 is of the type described in connection with FIG. 5, i.e. a reader for reading RFID identification elements where the reader comprises three detection areas: A writable detection area 406 as described in connection with FIG. 4 and two read-only detection areas 405a,b. FIG. 7 further shows a first toy 409 comprising a first identification element positioned on detection area 405b. In this example, the first toy resembles tractor attached to an identification element 407 comprising an RFID circuit as described in connection with the previous figures. When the tractor is positioned on the detection area 405b, the computer may control the video game so as to allow the user to control a virtual character to use or otherwise engage with a virtual tractor. To this end, information associating the identification element 407 with a virtual tractor may have been pre-stored on the identification element during manufacturing of the system, or the information may have been stored by the user, e.g. as described in connection with FIG. 1 or 6.

FIG. 7 shows a second toy 709 which comprises a second RFID identification element 707 and which is also positioned on detection area 405b, along with and next to the first toy. In this example, the second toy resembles an engine block which is attached to an identification element 707 as described in connection with the previous figures. When the tractor 409 is positioned on the detection area 405b along with the engine block 709, the computer may control the video game so as to allow the user to control a virtual character to use or otherwise engage with an enhanced virtual tractor, e.g. a tractor being capable of driving faster and/or pulling heavier equipment than the tractor without the enhancement. To this end, information associating the identification element 707 with an enhancement to a virtual tractor may have been pre-stored on the identification element during manufacturing of the system, or the information may have been stored by the user, e.g. as described in connection with FIGS. 4-6. Hence, the virtual tractor corresponding to toy 409 may possess different attributes depending on whether toy 409 is positioned within a detection area of the reader alone (or together with other items not configured to modify the tractor) or together with the engine block toy 709. When the tractor 409 is placed within the detection area 405b, the corresponding virtual tractor may also be represented in a different way on the display of the computer, depending on whether it is placed on the reading area with or without the engine block. For example, the virtual tractor may be displayed with a smaller or with a larger engine. It will be appreciated that the engine block 709 may also be configured to affect other virtual toys, e.g. a virtual car, a virtual air plane, depending on whether the engine block is positioned on a detection area along with a toy associated with a virtual car, a virtual air plane, etc. Moreover, it will be appreciated that the engine block may be configured not to affect certain other virtual items, such as a virtual character, a virtual tree, etc. even though the engine block is placed on the detection area with a physical toy associated with a virtual character, a virtual tree, etc. Hence, a physical toy may be associated with an accessory or enhancement to a virtual object that itself is associated with another physical toy. When the physical toy and the other physical toy are placed within the detection area of the reader, the virtual object associated with the other physical toy may be represented as having the accessory or enhancement. It will be appreciated that in some embodiments, the accessory toy has to be positioned within the same detection area as another toy for it to affect the virtual object associated with said other toy. In other embodiments, the accessory toy has to be positioned within a different detection area than another toy for it to affect the virtual object associated with said other toy. Finally, in yet alternative embodiments, the accessory toy may affect a virtual object associated with another toy regardless of whether the physical toy and the other toy are positioned in the same or in different detection areas. The particular enhancement provided may depend on the placement in the same or in different detection areas.

Figure 8:
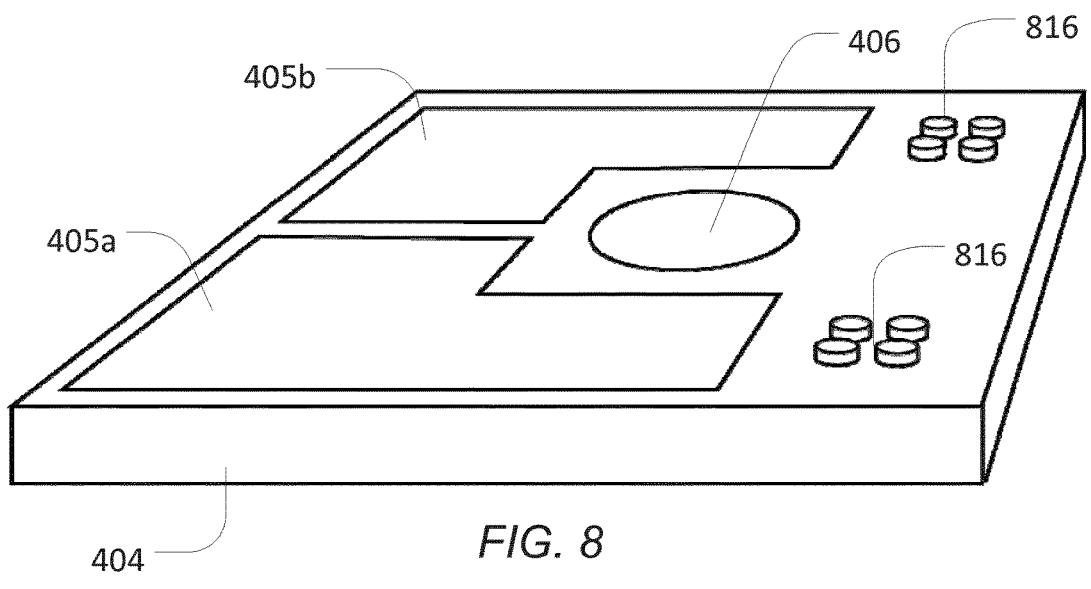
FIG. 8 illustrates an example of a detection device, also referred to as a reader.

FIG. 8 illustrates an example of an RFID reader 404. Though not explicitly shown in FIG. 8, the reader 404 which may be connected to a computer via a wired or wireless connection as described in connection with one or more of the previous figures. The reader 404 is of the type described in connection with FIG. 5, i.e. a reader comprising three detection areas: A writable detection area 406 as described in connection with FIG. 4 and two read-only detection areas 405a,b.

The detection areas are all located on the top surface of a housing of the reader 404, but spaced apart from each other. In the present example, the detection areas 405a and 405b are L-shaped and allow at least three identification elements to be positioned within each of the detection areas 405a and 405b, e.g. one identification element in each leg of the L and a third identification element in the area where the legs meet. The detection area 406 is shaped and sized so as to allow only a single identification element to be positioned within detection area 406 at a time. The top surface of the reader 406 comprises two sets of connectors 816a,b. In the present example, the connectors are protrusions arranged in a regular two-dimensional grid and configured to frictionally engage corresponding cavities on a bottom surface of another toy construction element. The connectors are arranged adjacent the respective detection areas 405a and 405b. So as to allow toy construction elements of the type described herein to be connected to the reader 404. Hence, the user may add decorative parts to the reader or the user may attach toy construction models including identification elements to the reader, e.g. as described in connection with FIG. 9 below.

Figure 9:
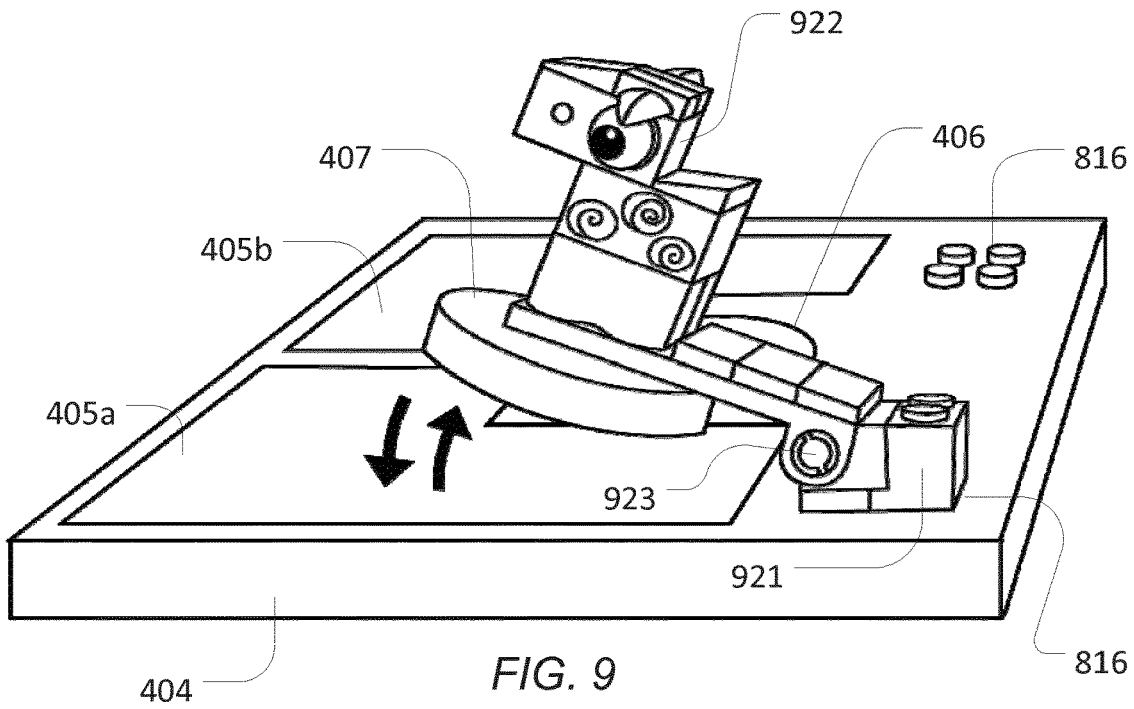
FIG. 9 illustrates the reader of FIG. 8 with a toy construction model detachably attached to it.

FIG. 9 shows the reader 404 of FIG. 8 with a toy construction model 909 attached to the connectors 816a next to detection area 405a The toy construction model 909 comprises a first part 921 and a second part 922 connected to the first part via a hinge 923, The first and second parts may be formed as a single component or from multiple toy construction elements. The second part comprises an identification element 407, e.g. an RFID identification element as described in connection with FIGS. 4-6. Hence, when the first part 1 is fixedly attached to the top surface of the reader 404, the second part 922 including identification element 407 may be pivoted around hinge 923 such that the identification element 407 may either be moved into an activated state close to detection area 405a or into an inactivated state further removed from the detection area 405a. Moreover, the identification element 407 comprises a coil antenna defining an axis projecting axially out of a bottom surface of the disc-shaped identification element. Similarly, detection area 405a has a reader antenna associated with it which also defines an axial direction projecting normally out of detection area 405a. In the activated state, the axes of the identification element 407 and of the detection area 405a are aligned with each other, while they are misaligned at the inactivated state. The reader is configured such that it can only detect the presence of identification element 407 within the detection area 405a, when the second part 922 is pivoted such that the identification element 407 is in the activated state. The computer connected to the reader 404 may thus be configured to control game play responsive to whether the detection element 407 is currently in the activated or in the deactivated state. Consequently, the user may conveniently activate/deactivate a function of the game system by lowering or raising the second part of the toy onto or away from the detection surface defining the detection area 405a. It will be appreciated that other embodiments may include different mechanisms for moving a movable part of a toy relative to a stationary part that is detachably attached to the reader, so as to bring an identification element included in the movable part into/out of a detectable state, i.e. such that the identification element can selectively be detected or remain undetected by a detection area of the reader. Examples of such movements include a rotation, a translational movement, e.g. along the contact surface of the reader or towards/away from the contact surface, or the like. It will further be appreciated that the second part may have a default state. For example, the second part may be spring-loaded or otherwise by default held in the detectable or in the non-detectable state. Similarly, the movement of the movable part relative to the stationary part may be manually operable or it may be operable by a driver device, e.g. an actuator or motor that may be driven by electrical energy or another suitable energy source. Activation or deactivation may be triggered by a sensor input, e.g. a user pressing a button, a detected environmental state, e.g. a light sensor, a microphone, a proximity sensor or the like.

Figure 10A:
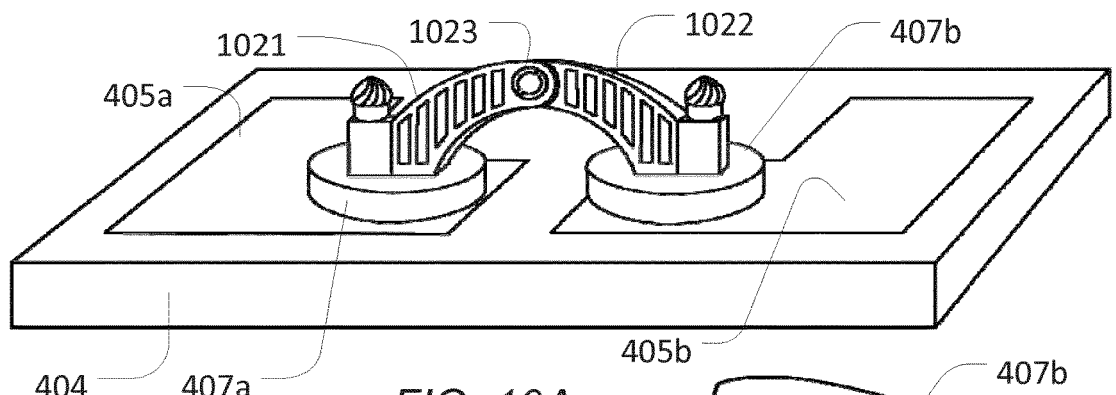
FIGS. 10A-B and 11A-C show examples of physical toys comprising more than one identification element.
Figure 10B:
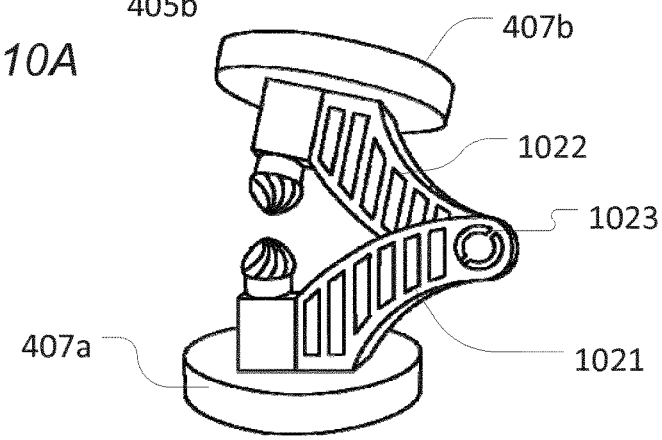
Figure 11A:
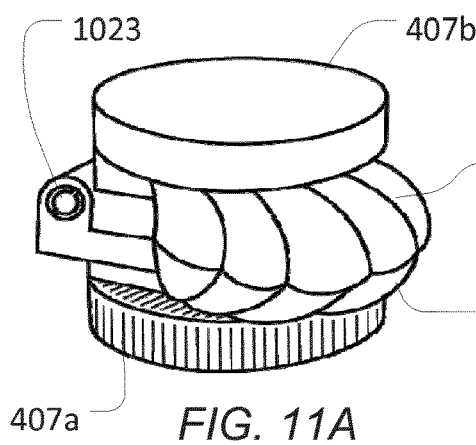
Figure 11B:
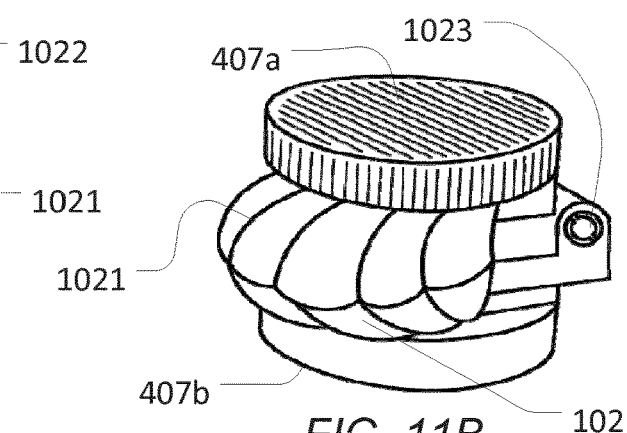

FIGS. 10A-B and 11A-C show examples of physical toys comprising more than one identification element. In particular, FIGS. 10A-B and 11A-C show examples of a physical toy that comprises a first part 1021 and a second part 1022 that are movably connected with each other, i.e. the toy is formed as a coherent structure but such that its respective interconnected parts may be moved relative to each other. In the present example, the movement includes pivoting the parts relative two each other around a hinge 1023. However, other forms of relative movement may be provided, e.g. translational movements, rotation etc. Each of the first and second parts include a respective identification element 407a and 407b, respectively, e.g. RFID identification elements of the type described in connection with FIGS. 4-6. The toy is configured such, that its parts may be moved relative to each other between a single detection state, e.g. as shown in FIGS. 10B, 11A and 11B, and a dual detection state, e.g. as shown in FIGS. 10A and 110. When in the single detection state, the two parts are oriented such that the toy may be placed on a detection area of a reader with only a single one of the identification elements being within the detection area, i.e. such that only one of the identification elements is detectable within the detection area, while the other identification element is out of range of the detection area and cannot be detected. When in the dual detection state, the two parts are oriented such that the toy may be placed on a detection surface of a reader with both identification elements being within a detection area, i.e. such that both identification elements are detectable by the reader.

For example the toy of FIGS. 10A-B resembles a bridge spanning between two pillars; the base of each pillar is formed by one of the identification elements. The bridge can be brought in an open state where both pillars can be placed onto a contact surface and in a closed state where only one of the pillars can rest on a contact surface at any time while the base of the other pillar points upwards, away from the contact surface.

Figure 11C:
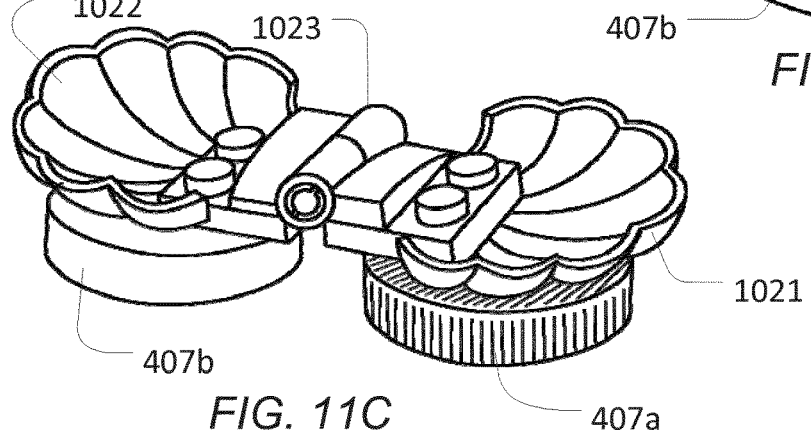

The toy of FIGS. 11A-C resembles a shell where the identification elements are located on the exterior surfaces of the shell. The shell can be brought in an open state where both identification elements can be placed on a contact surface and in a closed state where only one of the identification elements may be positioned on a contact surface at any time while the base of the other points upwards, away from the contact surface.

Hence, depending on how the parts are positioned relative to each other, the toy may be positioned on the reader with only one or with both identification elements on a detection area, e.g. within the same detection area or, as illustrated in FIG. 10A each within a different detection area. FIGS. 11A-C shows the shell in three different states: FIG. 11A shows the shell with identification element 407a pointing downwards and positioned on a detection area of a reader (not explicitly shown in FIGS. 11A-C). In this state, the other identification element 407b cannot be detected by the reader when identification element 407a is positioned within a detection area of the reader. FIG. 11B shows the shell with identification element 407b pointing downwards and positioned on a detection area of a reader. In this state, identification element 407a cannot be detected by the reader when identification element 407b is positioned within a detection area of the reader. FIG. 11C shows the shell with both identification elements 407a and 407b pointing downwards and positioned on a detection area of a reader. In this state, both identification elements 407a and 407b can simultaneously be detected in the same or in respective detection areas of the reader.

Similarly, FIG. 10B shows the bridge with identification element 407a pointing downwards and positioned on a detection area of a reader (not explicitly shown in FIG. 10B). In this state, identification element 407b cannot be detected by the reader when identification element 407a is positioned within a detection area of the reader. FIG. 10B shows the bridge with both identification elements 407a and 407b pointing downwards and positioned on—and simultaneously detectable by—respective detection areas of the reader, i.e. such that identification element 407a is positioned in detection area 405a and identification element 407b is positioned in detection area 405b.

Consequently, in the examples of FIGS. 10A-B and 11A-C, a reader can detect one or both identification elements and, thus, detect the current state of the corresponding toy, i.e. how the respective parts are positioned relative to each other. To this end, the identification elements 407a,b of a toy may comprise the same identifier or other information identifying the toy, e.g. identifying the shell or the bridge. Hence, in such an embodiment, a reader may identify the toy and distinguish a single detection state from a dual detection state. Alternatively, the identification elements of a toy may include different information, e.g. identifying the toy and the respective identification element, thus allowing the reader to further distinguish which of the two identification elements is detected in the single detection state, e.g. so as to distinguish between the states shown in FIGS. 11A and 13B. Consequently, the computer may control game play responsive to the detected state, e.g. allow a virtual character to pass across a virtual bridge associated with the physical toy of FIG. 10A-B, depending on whether the physical toy bridge is detected in its open or closed state. Similarly, a virtual shell may give access to its contents or have other attributes depending on whether the physical shell of FIGS. 11A-C is detected in its open or closed state.

The reader may further be configured to detect which detection area the, or each, identification element is placed, and the computer may control game play responsive to the determined detection area or areas. For example, each detection area may be associated with a respective region of a virtual world or other game space. When a toy is positioned within a detection area, a virtual character or virtual object may be positioned in the associated region of the virtual world or game space. In the example of FIG. 10A, i.e. when a bridge or other object is positioned with its identification elements positioned in two different detection areas, the regions associated with the two detection areas may be connected in the game, e.g. by a bridge or other passageway, so as t allow a virtual character to move between the regions along the bridge or other passage. For example the bridge or passage may provide a shortcut or passage not available to other virtual characters in the game.

As described above in connection with FIG. 9, the relative movement of the parts of the toy may be performed by applying a manual force, by a motor or other actuator. The toys of FIGS. 10A-B and 11A-C may be assembled for toy construction elements as described herein.

Even though the above examples show toys having two identification elements, it will be appreciated that other examples of physical toys may include 3, 4 or even more identification elements.

In the following, examples of toys will be described that comprise a sensor, e.g. a user-controllable input and one or more identification elements that transmit information about the sensor input to a reader.

Figure 12A:
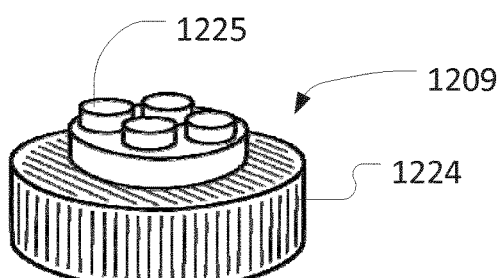
FIGS. 12A-C show an example of a toy comprising a push button.
Figure 12C:
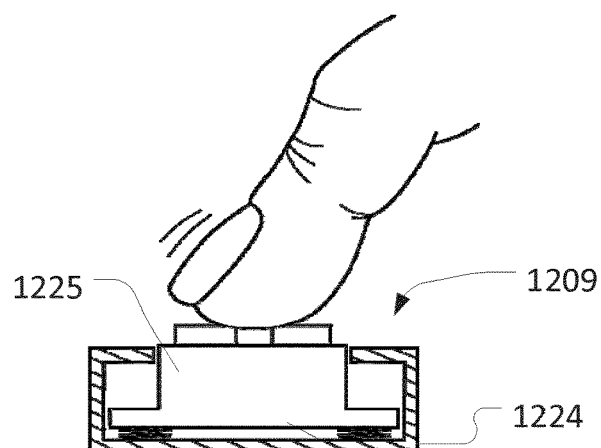
Figure 12B:
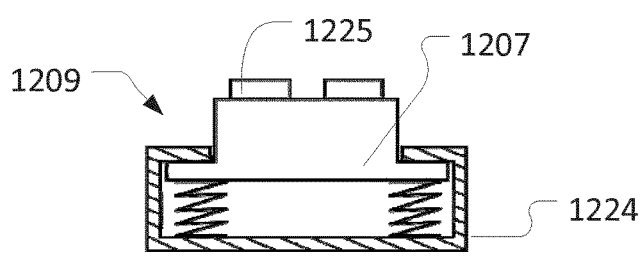

In particular, FIGS. 12A-C show an example of a toy 1209 comprising a push button. The toy may be formed as a self-contained toy element or it may be assembled from multiple toy construction elements, e.g. of the type described herein. The toy 1209 comprises a tubular member 1224 in which a button 1225 is slidably arranged. The button is spring-loaded towards one end of the tubular member and it can be pushed towards the other end by finger pressure. The base of the button comprises an identification element 1207, e.g. an RFID tag as described herein. When the toy 1209 is placed in a detection area of a reader, e.g. a reader as described in connection FIGS. 4-6 above, with the button 1225 facing upwards, the identification element 1207 is positioned at a distance from the detection area as defined by the axial length of the tubular member. The distance may thus be configured such that the identification element is not detectable by the detection area unless it is pressed downwards, by finger pressure applied directly to the button or by pressure applied by another toy construction element, e.g. one that is attached to the button. To this end, the button may comprise connectors for attaching other toy construction elements as described herein. FIG. 12A shows a perspective view of the toy with the button 1225 in its non-detectable state. FIG. 12B shows a cross-sectional view of the toy with the button 1225 in the not-detectable state while FIG. 12C shows a cross-sectional view of the toy with the button 1225 in an activated and detectable state.

Figure 13:
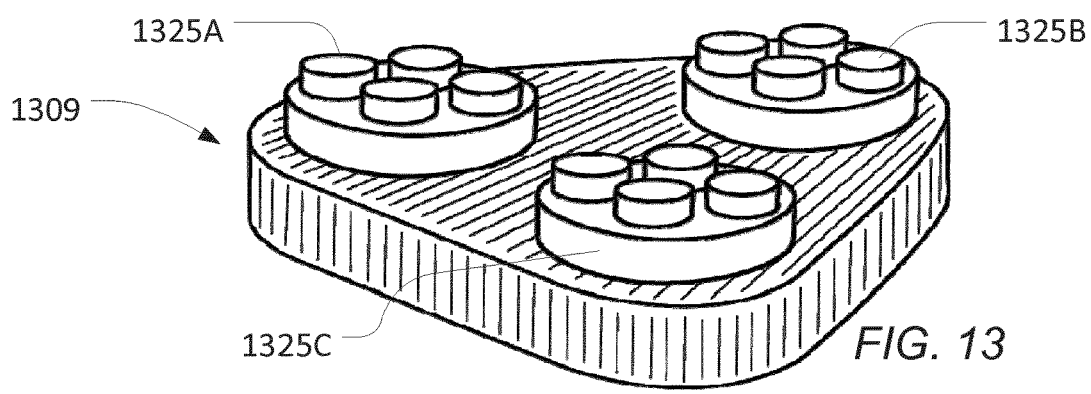
FIG. 13 shows an example of a toy which comprises three push buttons.

FIG. 13 shows another example of a toy 1309 which comprises three buttons 1325A-C, which each comprise an identification element which may selectively be brought into a detectable state by applying finger pressure to the corresponding button. The identification elements of the respective buttons may be configured to transit the same information when detected by a reader, or they may be configured to each transmit different information. Hence, a reader may be configured to detect the presence of the toy in a detection area and how many of the buttons are currently pressed. In some embodiments, the reader may even be capable of identifying which if the respective buttons are currently pressed.

It will be appreciated that other embodiments of toys may comprise other types of movable elements that may selectively be brought in a detectable state. Yet other toys may comprise an automatic mechanism comprising a sensor and an actuator configured to automatically bring an identification element into a detectable state responsive to the sensor signal.

Responsive to a sensor input, an identification element may also control the information transmitted to the reader in a different manner.

Figure 14:
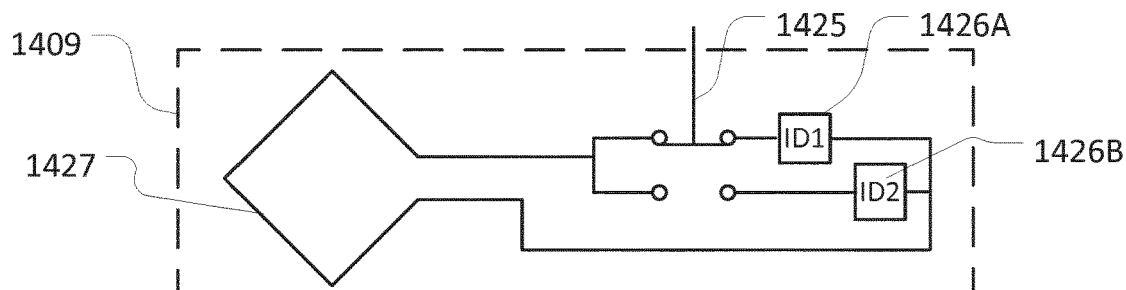
FIG. 14 illustrates an alternative example of a toy comprising a push-button.

For example, an alternative example of a toy comprising a push-button may be implemented using two RFID identification circuits that each are configured to transmit a respective ID, e.g. as illustrated schematically in FIG. 14. The toy element 1409 of FIG. 14 comprises two ID circuits 1426a,b that are electrically coupled, via a switch 1425 to an antenna 1427. For example, each identification circuit may comprise an RFID chip. The switch is configured to selectively couple one of the ID circuits to the antenna 1427 while the other ID circuit is decoupled from the antenna. Hence, depending on the activation state of the switch, either the information from one or from the other one of the ID circuits is transmitted. It will be appreciated that yet alternative embodiments of a toy may comprise a different number of ID circuits that can selectively be coupled to an antenna. For example, one embodiment of a toy may comprise a single identification circuit that may selectively be coupled to or decoupled from an antenna. Other examples may comprise 3, 4 or even more identification circuits such that none or one of the circuits may be coupled to the antenna at a given time.

It will be appreciated that the coupling of the identification circuits may be performed by galvanic, inductive or capacitive coupling or in a different suitable manner. In yet another embodiment, the information transmitted by the toy may be controlled in a different manner, e.g. by selectively shielding the antenna or otherwise changing the transmission characteristics of the antenna. Yet alternatively, the identification circuit may comprise a memory, where the identification circuit is configured to transmit information stored in the memory to a reader. The identification circuit may further comprise a control circuit that receives a signal indicative of the activation state of a selector or another form of sensor signal. The control circuit may then be configured to store information about said activation state or other sensor signal in the in the memory, thus causing the identification circuit to transmit the stored information indicative of the activation state or other sensor signal to a reader. The toy may be configured such that the memory content can be altered only when the toy is within the detection area. Alternatively, the toy may be configured such that the memory content can be altered only when the toy is not within the detection area. In yet alternative embodiments, the toy may be configured such that the memory content can be altered regardless of whether or not the toy is within the detection area. A computer receiving input from the reader may thus control game play based on the detected activation state or other sensor signal of the toy.

In the examples of FIGS. 13A-C, the toy comprises a push button. However, alternative embodiments may comprise other forms of user-controllable activators or selectors, e.g. a turn button. For example, a turn button may allow a user to selectively couple one of a plurality ID circuits to an antenna, e.g. by rotating a contact member. Yet other embodiments may comprise other types of sensors, e.g. a light sensor, a vibration sensor, a tilt sensor, etc.

In the example of FIGS. 13A-C and in other embodiments, an activation of the push button is only detectable when the button is pressed while the toy is located within the detection area. Nevertheless, other embodiments of toys may comprise a sensor that is configured to detect an activation, measure a parameter or provide another form of sensor input when the toy is not in the detection area, and to transmit information about such activation, measurement or other form of sensor input when the toy is subsequently positioned within the detection area of a reader. For example, the position of a selector switch may be altered by a user, while the user holds the toy in the user's hand prior to placing the toy on a detection area of a reader. Another example of a toy may comprise a vibration sensor that detects a degree of vibration—e.g. a degree by which a user has shaken the toy—and stores the detected degree in a memory such that the information can subsequently be transmitted when the toy is again placed in the detection area of a reader.

FIGS. 15 A-C show another example of a toy that comprises a sensor. In the example of FIGS. 5A-C, the sensor is a user-controllable rotatable knob. The toy comprises circuitry including an identification element that transmits information indicative of the angular position of the rotatable knob. In particular FIG. 5A schematically shows an electric control circuitry of the toy, FIG. 5B shows an exploded view of the toy while FIG. 5C shows a 3D view of the assembled toy.

The toy, generally designated 1509, comprises a housing which is formed by a base plate 1536 and a generally dome-shaped cover 1528. The dome-shaped cover 1528 comprises a hole 1540 at the apex of the dome through which a knob 1525 extends. In particular, a part of the knob extends upwards out of the hole 1540 such that this part of the knob can be rotated relative to the cover and around a central axis defined by the knob and the dome-shaped cover. The knob 1525 comprises connectors 1514 at its top surface which allow one or more toy construction elements to be attached to the knob, e.g. so as to configure the knob with decorative parts or to provide it with a customized gripping portion. The knob 1525 further comprises a radially outward extending indicator element 1542 which indicates the current angular position of the knob relative to the cover. To this end, different indicia may be provided on the outside surface of the cover, such that the indicator points towards different indicia at different angular positions.

The part of the knob extending inwardly into the hole 1540 is attached to a rotatable member 1529 such that the rotatable member 1529 rotates around the central axis when the knob is rotated. To this end, the rotatable member is rotatably supported on the base plate 1536. The rotatable member comprises an electrically conductive activation member 1530 which also rotates together with the rotatable member 1529 and the knob 1525. The activation member comprises two spring biased conductive terminals 1531 and 1532 respectively, each configured to follow a circular trajectory when the knob 1525 is rotated. The electrically conductive activation member provides an electrically conducting path connecting the terminals 1531 and 1532 with each other. The trajectories defined by movement of the terminals 1531 and 1532 when the knob 1525 is rotated are concentric circles around the central axis. The radius of the circle defined by the trajectory of terminal 1532 is larger than the corresponding radius of the trajectory of terminal 1531.

The toy further comprises an identification element in the form of an annular circuit board 1533 fixedly disposed on the base plate 1536 and inside the cover 1528 such that the spring biased terminals are in contact with a top surface of the circuit board 1533. The top surface of the circuit board comprises an inner circular conductive path 1535 and a number of separate conductive path segments 1534. The conductive path segments are each formed as an arc such that they together define an outer circle, but where the individual path segments are electrically insulated from each other and from the inner circular conductive path 1535. The inner and outer circles are concentric and correspond to the circular trajectories of the terminals 1531 and 1532, respectively. Hence, when the knob is turned, the inner terminal 1531 is always in electric contact with the inner circular conductive path 1535 while the outer terminal 1532 is either in contact with one of the conductive path segments 1534 or with an insulating arc portion separating two of the conductive path segments 1534. Accordingly, depending on the angular position of the knob, the activation member provides a conductive path between none or one of the conductive path segments 1534 and the inner circular conductive path 1535. In the example of FIGS. 15A-C, the circuit board comprises eight path segments 1534. However, it will be appreciated that other embodiments may comprise a different number of path segments.

The circuit board 1533 further accommodates the electric circuit shown in FIG. 15A. The circuit comprises a microcontroller unit 1538, and RFID identification circuit 1539 operationally coupled to the microcontroller unit, and an RFID antenna 1527 operationally coupled to the RFID identification circuit 1539. The microcontroller unit 1538 comprises a plurality of switch contacts that are connected to respective ones of the path segments 1534. The microcontroller unit further comprises a baseline input that is connected to the inner circular conductive path 1535. Hence, depending on the angular position of the knob 1525 none or one of the switch contacts of the microcontroller unit is connected to the baseline input of the microcontroller unit. The microcontroller unit is configured to cause the RFID identification circuit to transmit, when interrogated, data that is indicative of which of the switch contacts, if any, is connected to the baseline. Accordingly, when interrogated by an RFID reader, the control circuit of FIG. 15A responds with data that is indicative of the current angular position of the knob 1525. For example, each of the angular positions of the knob may be associated with a different ID.

When the toy 1509 is placed in a detection area of a reader, e.g. a reader as described in connection FIGS. 4-6 above, the reader can detect the current angular position of the knob and digital game play may be controlled responsive to the detected angular position of the knob 1525. The knob 1525 is thus a user-controllable actuator whose position is detected by the toy and communicated to a reader.

In the above various embodiments of the various aspects disclosed in this specification have been described.

For example, embodiments of a toy with two or more identical identification elements (e.g. identification elements transmitting the same ID or other information), also referred to as tags, have been described. Examples of the toys allow a user to adjust the physical appearance of the toy. The adjustment also allows the user to change the relative positions and/or orientations of the identification elements relative to each other. Two (or more tags) that are identical, may thus be placed in a toy, in a way so they can be read by a reader with one (or more) detection areas, either one by one or more than one at the time. Embodiments of the digital game executed by the game system may show a different virtual item, or alter a behaviour of a virtual item, depending on how many tags are read and, optionally, whether the different tags are on the same detection area or not. For example, a physical toy may resemble a shell, if one tag is read, a virtual shell may be displayed where the shell is closed. If two tags are read, the shell is opened. If the tags are read by different reading areas, this might give access to different digital content.

In some embodiments of aspects described herein, different detection areas of a reader each represent a different place in the game. If two identical tags that are connected to the same toy are placed on different detection areas—i.e. such that the toy spans across a gap between the detection areas, the represented areas in the game will be connected, eg. via a wire, bridge, rope or vortex. This function may also be implemented with two (or more) toys (similar looking or not similar looking) with identical tags, that are not connected, but visually represent a connection point, this could be an elevator, train station, gate, door, phone, etc.

In some embodiments, the virtual counterparts of unconnected or connected toys with identical tags may become connected in the digital game, if they are placed on the same detection area. For example, if two toys resembling tiny creatures are positioned on the detection area, a single creature with a new appearance and/or ability may appear in the digital game.

In some embodiments, tags that may be operated as buttons may be provided. In such embodiments one (or more) tag(s) that may be positioned in a proximity or even contact of a detection device, but with the tag being outside of a detection range of the detection device. When a button or other activator is pushed down/rotated etc. the tag may be brought into the detection range of the reader and cause a function of the digital game play to be activated, e.g. by presenting different possibilities in the digital game. Selection may then be made by letting go of the tag. In some embodiments, the toy may have two or more identical tags, where different functions/representations are activated in game depending on how many tags are read. In some embodiments the functions/representations may also be made dependent on which of multiple detection areas a tag is detected in.

Similarly, examples of a toy with two or more unique identification elements (e.g. identification elements transmitting different IDs or other information) have been described. Here the term unique is intended to refer to tags that may be distinguished from another. In some embodiments two (or more) tags that are unique may be placed in a toy in a way so they can be read by a reader with one (or more) detection areas, either one by one or more than one at the time. The digital game may then show a differently looking virtual item, or a virtual item that behaves or operates differently, depending on which of the tags of the physical toy are read, optionally in what combination and whether the different tags are on the same detection area or not. A physical toy may comprise two distinguishable tags be configured such that only one tag is detectable at the time. For example, the tags may be provided on different sides, e.g. opposite sides, of a toy. Tags with toys resembling items/vehicles/engines etc. may cause virtual in-game counterparts of the toys to be combined into one item/vehicle/engine etc. with new properties, when those tags are place in a detection area specified by the game system. These toys could also be shaped like puzzle pieces, or otherwise physically interlocking, so their look signalizes that they can be combined.

Embodiments of the method described herein can be implemented by means of hardware comprising several distinct elements, and/or at least in part by means of a suitably programmed microprocessor.

In the claims enumerating several means, several of these means can be embodied by one and the same element, component or item of hardware.

The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

What is claimed is:

1. A toy construction system comprising toy construction elements configured for mechanically interconnecting to construct a toy construction model, the toy construction system comprising:

a physical toy having one or more connectors compatible with the toy construction system, wherein the physical toy comprises a first part and a second part movably arranged relative to the first part, wherein the second part comprises an identification element comprising information relating to the identification element and/or the physical toy; and a detection device configured to detect a presence of the identification element within a detection area of the detection device, wherein the detection device includes one or more connectors compatible with the toy construction system, wherein the one or more connectors of the physical toy are detachably connectable to the one or more connectors of the detection device; and wherein, when the first part of the physical toy is connected to the one or more connectors of the detection device, the second part of the physical toy is movable relative to the detection area between a detectable state and a non-detectable state, where the detection device is configured to detect the identification element only when the second part is in the detectable state.

2. The toy construction system according to claim 1, wherein the physical toy is a coherent structure constructed from one or more toy construction elements of the toy construction system.

3. The toy construction system according to claim 1, wherein the detection device comprises at least two detection areas, and wherein the detection device is configured to detect the presence of an identification element within each of the detection areas and to detect in which detection area the identification element is detected.

4. The toy construction system according to claim 1, wherein the physical toy is configured to transmit information to the detection device when the identification element is positioned in the detection area of the detection device; wherein the physical toy comprises a sensor configured to detect an input and wherein the physical toy is configured to alter said transmitted information responsive to the detected input.

5. The toy construction system according to claim 1, wherein the identification element is a toy construction element comprising one or more connectors configured for mechanically connecting one or more other toy construction elements to the identification element so as to allow a user to construct a toy construction model.

6. The toy construction system according to claim 1, wherein the information relating to the identification element comprises an identifier identifying the identification element and/or the physical toy.

7. The toy construction system according to claim 1, wherein the identification element comprises a memory having stored thereon the information relating to the identification element and/or the physical toy.

8. The toy construction system according to claim 1, wherein movement of the identification element relative to the detection area comprises altering a distance between the detection area and the identification element and/or altering a relative orientation between the identification element and the detection area.

9. The toy construction system according to claim 1, wherein the detection device comprises a sensor having a detection range and/or a predominant direction of detection.

10. The toy construction system according to claim 9, wherein the sensor comprises a coil antenna arranged relative to the detection area and defining an axial direction of the coil.

11. The toy construction system according to claim 9, wherein the identification element defines an identification direction, and movement of the identification element into the detectable state includes aligning the identification direction with the detection direction.

12. The toy construction system according to claim 1, wherein the identification element comprises a coil antenna defining an axial direction.

13. The toy construction system according to claim 1, wherein the physical toy is configured to allow relative movement of the first and second parts.

14. The toy construction system according to claim 1, wherein the relative movement is generated by one or more of manual force, a motor, and an actuator.

15. The toy construction system according to claim 1, further comprising a plurality of physical toys interchangeably connectable to the toy construction system.

16. The toy construction system according to claim 1, wherein the physical toy comprises two or more identification elements.

17. The toy construction system according to claim 16, wherein the physical toy is configured to allow a user to selectively position the physical toy with only a user-selected subset of the two one or more of said identification elements within the detection area.

18. The toy construction system according to claim 1, wherein the first and second parts may be formed as a single component or from multiple toy construction elements.

19. The toy construction system according to claim 1, wherein a position of the first part of the physical toy is fixed relative to the detection area when the physical toy is connected with the detection device.

* * * * *